US012675161B2

(12) United States Patent
Yamano et al.

(10) Patent No.: US 12,675,161 B2
(45) Date of Patent: Jul. 7, 2026

(54) INPUT DEVICE, SYSTEM, AND CONTROL METHOD

(71) Applicant: Sony Group Corporation, Tokyo (JP)

(72) Inventors: Ikuo Yamano, Tokyo (JP); Kunihito Sawai, Kanagawa (JP); Keijiroh Nagano, Tokyo (JP); Kei Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/576,165

(22) PCT Filed: Feb. 22, 2022

(86) PCT No.: PCT/JP2022/007274
§ 371 (c)(1),
(2) Date: Jan. 3, 2024

(87) PCT Pub. No.: WO2023/286316
PCT Pub. Date: Jan. 19, 2023

(65) Prior Publication Data
US 2025/0093955 A1 Mar. 20, 2025

(30) Foreign Application Priority Data

Jul. 14, 2021 (JP) ................................. 2021-116212

(51) Int. Cl.
G06F 3/01 (2006.01)
G06F 3/0346 (2013.01)
(Continued)

(52) U.S. Cl.
CPC .............. G06F 3/014 (2013.01); G06F 3/013 (2013.01); G06F 3/016 (2013.01); G06F 3/0346 (2013.01);
(Continued)

(58) Field of Classification Search
CPC .... G06F 3/011–014; G06F 3/016; G06F 3/02; G06F 3/0304; G06F 3/033;
(Continued)

(56) References Cited

U.S. PATENT DOCUMENTS

2013/0135223 A1 5/2013 Shai
2016/0058375 A1* 3/2016 Rothkopf ................ G06F 3/015
600/323
(Continued)

FOREIGN PATENT DOCUMENTS

JP 2016-033815 A 3/2016
JP 2017-513126 A 5/2017
(Continued)

*Primary Examiner* — Nathan Danielsen
(74) *Attorney, Agent, or Firm* — Paratus Law Group, PLLC

(57) ABSTRACT
There is provided an input device, a system, and a control method capable of performing an operation input that is more natural, less burdensome, and less bothersome in operations in daily life. The input device includes a ring-shaped main body portion to be mounted on a finger of a user; one or more sensors that are provided in the main body portion and that detect information regarding an operation input by another finger; a communication unit that performs wireless communication with an external device; and a control unit that performs control to transmit the information regarding the operation input detected by the one or more sensors to the external device by the communication unit.

20 Claims, 27 Drawing Sheets

IN CASE OF MOUNTING ON RIGHT HAND

IN CASE OF MOUNTING ON LEFT HAND

(51) Int. Cl.

| | | |
|---|---|---|
| *G06F 3/038* | (2013.01) | |
| *G06F 3/02* | (2006.01) | |
| *G06F 3/0354* | (2013.01) | |

(52) U.S. Cl.
CPC .............. *G06F 3/0383* (2013.01); *G06F 3/02* (2013.01); *G06F 3/03547* (2013.01); *G06F 2203/0331* (2013.01); *G06F 2203/0384* (2013.01)

(58) Field of Classification Search
CPC .. G06F 3/0346; G06F 3/0354; G06F 3/03547; G06F 3/038; G06F 3/0383; G06F 2203/0331; G06F 2203/0335; G06F 2203/0338; G06F 2203/0339; G06F 2203/0384
See application file for complete search history.

(56) References Cited

U.S. PATENT DOCUMENTS

| | | | |
|---|---|---|---|
| 2016/0077582 A1 | 3/2016 | Song et al. | |
| 2016/0292563 A1* | 10/2016 | Park | G06F 3/014 |
| 2017/0176267 A1* | 6/2017 | Keller | G06F 3/014 |
| 2020/0026352 A1 | 1/2020 | Wang et al. | |
| 2020/0356162 A1 | 11/2020 | Wang et al. | |
| 2021/0089131 A1 | 3/2021 | Wang et al. | |
| 2021/0389829 A1* | 12/2021 | Erivantcev | G06F 3/014 |

FOREIGN PATENT DOCUMENTS

| | | | |
|---|---|---|---|
| JP | 2019-526864 A | 9/2019 | |
| JP | 2019-536189 A | 12/2019 | |
| JP | 2020-174787 A | 10/2020 | |

* cited by examiner

FIG. 2

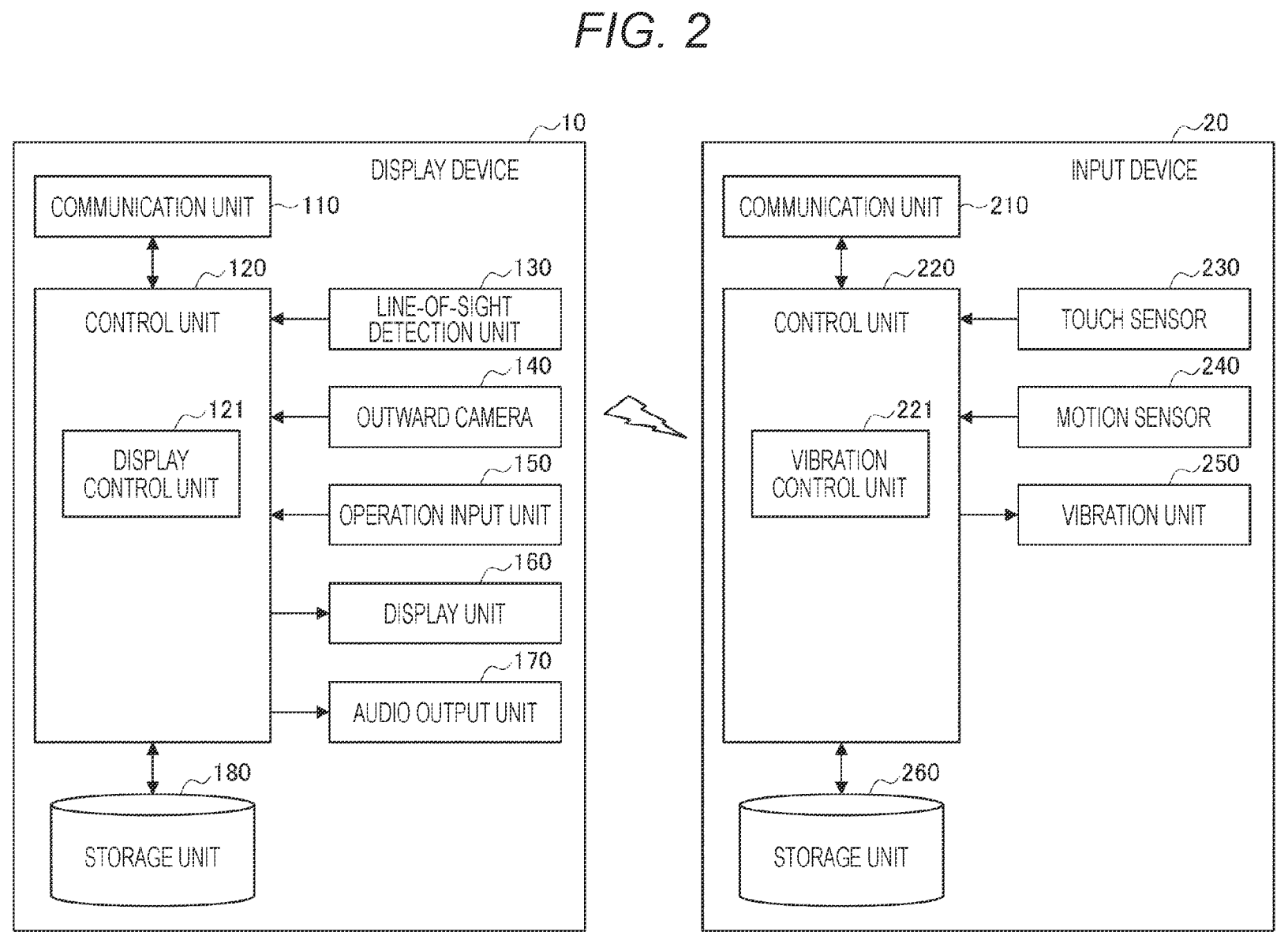

DISPLAY DEVICE 10

COMMUNICATION UNIT 110

CONTROL UNIT 120

DISPLAY CONTROL UNIT 121

LINE-OF-SIGHT DETECTION UNIT 130

OUTWARD CAMERA 140

OPERATION INPUT UNIT 150

DISPLAY UNIT 160

AUDIO OUTPUT UNIT 170

STORAGE UNIT 180

INPUT DEVICE 20

COMMUNICATION UNIT 210

CONTROL UNIT 220

VIBRATION CONTROL UNIT 221

TOUCH SENSOR 230

MOTION SENSOR 240

VIBRATION UNIT 250

STORAGE UNIT 260

Figure 8:
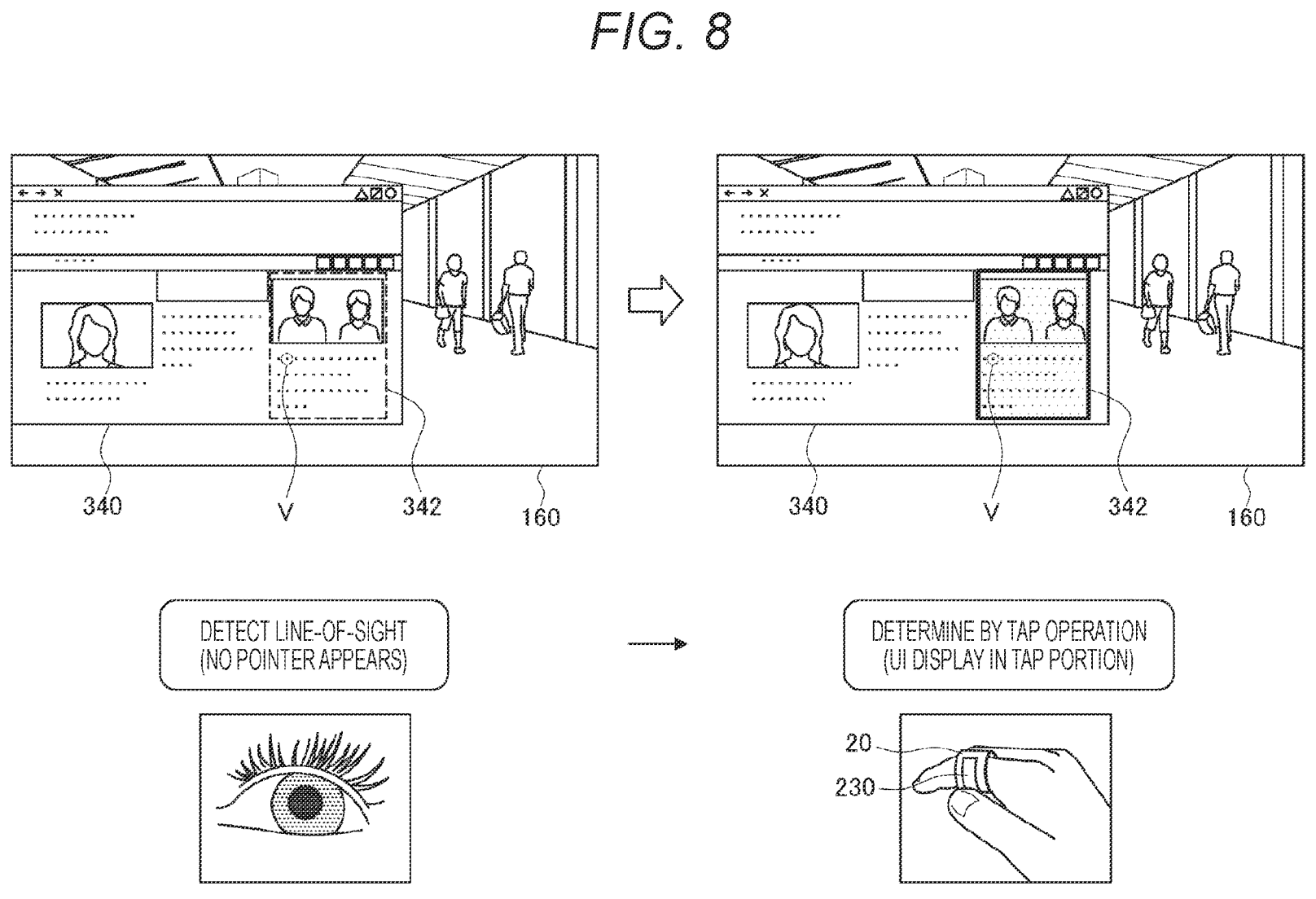

DETECT LINE-OF-SIGHT
(NO POINTER APPEARS)

160

342

340

DETERMINE BY TAP OPERATION
(UI DISPLAY IN TAP PORTION)

DISTANCE FROM OPERATION DEVICE
(RING DEVICE) TO MIDDLE JOINT OF FINGER: D1

DISTANCE FROM OPERATION DEVICE
(RING DEVICE) TO MIDDLE JOINT OF FINGER: D2

DISTANCE FROM OPERATION DEVICE
(RING DEVICE) TO MIDDLE JOINT OF FINGER: D3

DISTANCE FROM OPERATION DEVICE
(RING DEVICE) TO THUMB; D10

DISTANCE FROM OPERATION DEVICE
(RING DEVICE) TO THUMB; D11

IN CASE OF MOUNTING ON RIGHT HAND                    IN CASE OF MOUNTING ON LEFT HAND

FIG. 25

SET TO: 22°C

INPUT DEVICE, SYSTEM, AND CONTROL METHOD

CROSS REFERENCE TO PRIOR APPLICATION

This application is a National Stage Patent Application of PCT International Patent Application No. PCT/JP2022/007274 (filed on Feb. 22, 2022) under 35 U.S.C. § 371, which claims priority to Japanese Patent Application No. 2021-116212 (filed on Jul. 14, 2021), which are all hereby incorporated by reference in their entirety.

TECHNICAL FIELD

The present disclosure relates to an input device, a system, and a control method.

BACKGROUND ART

Conventionally, various input devices such as a mouse, a keyboard, and a touch pad are used for an operation input to an information processing device.

For example, Patent Document 1 below discloses a user operation sensing device in a ring shape used by being worn on a finger of a user. The device described in Patent Document 1 detects movement of a finger (thumb) itself on which the device is mounted by two types of sensors, and determines a click operation or a direction key operation.

CITATION LIST

Patent Document

Patent Document 1: Japanese Unexamined Patent Application Publication No. 2019-536189

SUMMARY OF THE INVENTION

Problems to be Solved by the Invention

Here, it is required to perform an operation input that is more natural, less burdensome, and less bothersome in operations in daily life.

Solutions to Problems

According to the present disclosure, there is proposed an input device including: a ring-shaped main body portion to be mounted on a finger of a user; one or more sensors that are provided in the main body portion and that detect information regarding an operation input by another finger; a communication unit that performs wireless communication with an external device; and a control unit that performs control to transmit the information regarding the operation input detected by the one or more sensors to the external device by the communication unit.

According to the present disclosure, there is proposed a system including: an operation input information acquisition unit that acquires, from one or more sensors that are provided in a ring-shaped main body portion to be mounted on a finger of a user and that detect information regarding an operation input by another finger, the information regarding the operation input; a line-of-sight information acquisition unit that acquires line-of-sight information regarding the user; and a presentation control unit that controls information to be presented to the user on the basis of the information regarding the operation input and the line-of-sight information.

According to the present disclosure, there is proposed a control method by a processor, the control method including: detecting, by one or more sensors provided in a ring-shaped main body portion to be mounted on a finger of a user, information regarding an operation input by another finger; and performing control to transmit the detected information regarding the operation input to an external device by a communication unit that performs wireless communication.

According to the present disclosure, there is proposed a control method by a processor, the control method including: acquiring, from one or more sensors that are provided in a ring-shaped main body portion to be mounted on a finger of a user and that detect information regarding an operation input by another finger, the information regarding the operation input; acquiring line-of-sight information regarding the user; and controlling information to be presented to the user on the basis of the information regarding the operation input and the line-of-sight information.

BRIEF DESCRIPTION OF DRAWINGS

FIG. 2 is a block diagram illustrating an example of a configuration of a display device and an input device included in the information processing system according to the present embodiment.

FIG. 6 is a view for describing an example of an operation method for a two-dimensional image according to the present embodiment.

FIG. 7 is a view for describing an example of an operation method for the two-dimensional image according to the present embodiment.

FIG. 8 is a view for describing an example of an operation method for the two-dimensional image according to the present embodiment.

FIG. 11 is a view for describing an example of a relationship between a direction of a touch operation and a movement direction of a pointer in the position adjustment mode according to the present embodiment.

FIG. 25 is a view for describing an operation for a real object using the pointer UI according to the present embodiment.

MODE FOR CARRYING OUT THE INVENTION

Hereinafter, a preferred embodiment of the present disclosure will be described in detail with reference to the accompanying drawings. Note that, in the present specification and the drawings, components having substantially the same functional configuration are denoted using the same reference signs, and redundant description is omitted.

Furthermore, the description will be made in the following order.

1. Overview of information processing system according to embodiment of present disclosure
2. Configuration example
   2-1. Display device
   2-2. Input device
3. Operation processing
4. Operation method
   4-1. Operation method for two-dimensional image
   4-2. Operation method for three-dimensional image
       (4-2-1. Direct operation of virtual object)
       (4-2-2. Remote operation of virtual object)

5. Mounting position and structure of input device
   5-1. Mounting position of input device 20
   5-2. Structure of input device 20
6. Modification
   6-1. Audio input from input device 20
   6-2. Another use method of input device 20
7. Supplement

Figure 1:
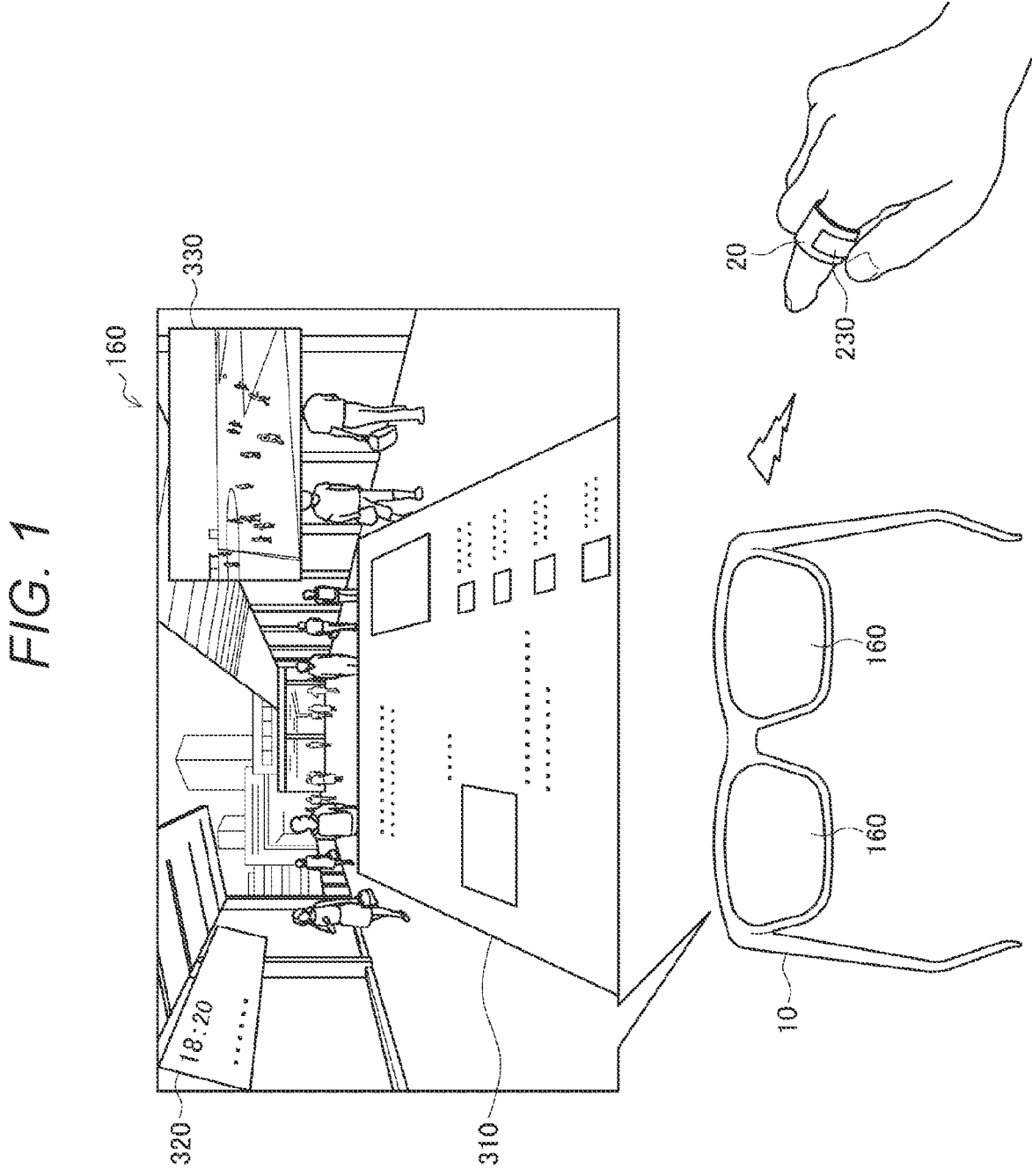
FIG. 1 is a view for describing an overview of an information processing system according to an embodiment of the present disclosure.

1. Overview of Information Processing System According to Embodiment of Present Disclosure FIG. 1 is a view for describing an overview of an information processing system according to an embodiment of the present disclosure. As illustrated in FIG. 1, the information processing system according to the present embodiment includes a display device 10 and an input device 20.

As illustrated in FIG. 1, the input device 20 according to the present embodiment is mounted on a finger of a user, and has a function of detecting information regarding an operation input to the display device 10 by the user. For example, the input device 20 is provided with a touch sensor 230 as an example of a sensor, and can detect information regarding a touch operation as the information regarding the operation input. The input device 20 transmits the detected information regarding the operation input to the display device 10 that is an external device.

The display device 10 is an example of an information processing device that presents information to a user. In the present embodiment, visual information is presented as an example of the information to be presented to the user. Other examples of the information to be presented to the user include auditory information presented by an audio output device, vibration information presented by a vibration device, and the like. The display device 10 may be an optical see-through type or non-see-through type head mounted display (HMD) to be mounted on a head of the user.

As illustrated in FIG. 1, the display device 10 according to the present embodiment can be implemented by a glasses-type device in which an optical see-through type display unit 160 is provided in a lens unit. In the display unit 160, an image that is information regarding a virtual space (hereinafter, referred to as a virtual object) is displayed in a superimposed manner in a real space in a state where the real space is directly viewed by an eye of a user. As described above, the display device 10 is the information processing device that provides so-called augmented reality (AR) to a user. Note that the information processing device that provides the AR according to the present embodiment is not limited to an optical see-through type device, and may be a non-see-through type device using a video see-through display. In the video see-through display, a video (a video of the real space) obtained by capturing a head direction of a user is displayed in real time, and a virtual object is superimposed and displayed on the video. Furthermore, it is also possible to switch between a see-through type display (optical see-through display) and a non-see-through type display by providing, in the video see-through display, a configuration that dynamically shields light in the real space.

On the display unit 160 of the display device 10, for example, as illustrated in FIG. 1, virtual objects 310, 320, and 330 that present various types of information are displayed. The virtual object may be two-dimensional content, or may be a three-dimensional object or a user interface (UI). Examples of the two-dimensional content include a website, a screen of a social networking service (SNS), a photograph, a moving image, an electronic book, and the like.

Here, a user can perform an operation input from the input device 20 to the virtual objects displayed on the display unit 160 of the display device 10. Specifically, for example, by performing a touch operation such as a tap operation or a swipe operation with a thumb on the touch sensor 230 provided in the ring-shaped input device 20 worn on an index finger, a selection/determination operation or a scroll operation can be performed on the virtual objects.

As described above, in the present embodiment, since an operation input can be performed with another finger on the ring-shaped input device 20 mounted on a finger, it is possible to perform an operation input that is more natural, less burdensome, and is less bothersome in operations in daily life. For example, a method in which an arm is raised forward and a virtual object is directly operated by a hand may be conspicuous and may generate resistance in a town where there are people around. Furthermore, in a method in which the glasses-type device is directly tapped, since a hand has to be brought to a face, an arm is easily tired. Furthermore, in a method using a grip type remote controller (remote controller), it is troublesome to carry and take out the remote controller. In the present embodiment, by using the input device 20 that is mounted on a finger and can perform an operation input at hand even in a state where a hand is lowered, it is possible to implement an operation input in which the botheration as described above is reduced and which is more natural and less burdensome in operations in daily life.

2. Configuration Example

FIG. 2 is a block diagram illustrating an example of a configuration of the display device 10 and the input device 20 included in the information processing system according to the present embodiment. Hereinafter, each of the devices will be sequentially described.

<2-1. Display Device 10>

As illustrated in FIG. 1, the display device 10 (information processing device) includes, for example, a communication unit 110, a control unit 120, a line-of-sight detection unit 130, an outward camera 140, an operation input unit 150, the display unit 160, an audio output unit 170, and a storage unit 180. Note that the configuration illustrated in FIG. 1 is an example, and the configuration of the display device 10 is not limited thereto.

(Communication Unit 110)

The communication unit 110 is communicably connected to an external device in a wired or wireless manner to transmit and receive data. For example, the communication unit 110 can be communicably connected to the input device 20 by wireless communication such as Wi-Fi (registered trademark) or Bluetooth (registered trademark). Furthermore, the communication unit 110 can be communicably connected to the Internet by a wired/wireless local area network (LAN), Wi-Fi (registered trademark), Bluetooth (registered trademark), a mobile communication network (long term evolution (LTE), a third generation mobile communication system (3G), a fourth generation mobile communication system (4G), and a fifth generation mobile communication system (5G)), or the like, and can transmit and receive data to and from a server on a network.

Furthermore, the communication unit 110 according to the present embodiment also functions as an operation input information acquisition unit that acquires information regarding an operation input from the input device 20.

(Control Unit 120)

The control unit 120 functions as an arithmetic processing device and a control device, and controls overall operations in the display device 10 according to various programs. The control unit 120 is implemented by, for example, an electronic circuit such as a central processing unit (CPU) or a microprocessor. Furthermore, the control unit 120 may include a read only memory (ROM) that stores programs, operation parameters, and the like to be used, and a random access memory (RAM) that temporarily stores parameters and the like that change appropriately.

Furthermore, the control unit 120 according to the present embodiment also functions as a display control unit 121. The display control unit 121 performs control to display a virtual object on the display unit 160. The display control unit 121 according to the present embodiment is an example of a presentation control unit that performs control to present information to a user. The virtual object is a two-dimensional or three-dimensional image. Note that the display control unit 121 can also control a display position and posture of the virtual object superimposed on the real space on the basis of an analysis result of a captured image in a head direction of a user (a captured image including at least a visual field range of the user) acquired by the outward camera 140. Furthermore, the display control unit 121 can also control the display position and the posture of the virtual object in consideration of a self-position and posture of the user. Analysis (object recognition or the like) of the captured image can be performed by the control unit 120. Furthermore, the self-position and the posture of the user can be detected by various sensors provided in the display device 10. Examples of the various sensors include the outward camera 140, a gyro sensor, an acceleration sensor, a geomagnetic sensor, a position measurement unit, and the like. The position measurement unit may be a measurement unit that measures an absolute position (for example, position measurement using a global navigation satellite system (GNSS)) or a measurement unit that measures a relative position (for example, position measurement using Wi-Fi or Bluetooth signals).

Data of the virtual object to be displayed may be data stored in the storage unit 180, data received from an external device via the communication unit 110, or data generated by the control unit 120. Examples of the external device include a server on the Internet and a communication terminal (for example, a smartphone, a tablet terminal, a wearable device, or the like) possessed by a user.

Furthermore, the display control unit 121 can perform display control of the virtual object on the basis of information regarding an operation input received from the input device 20 via the communication unit 110. For example, the display control unit 121 performs control such as selection, determination, scrolling, or zooming on the virtual object according to the received information regarding the operation input. The information regarding the operation input is information detected by various sensors provided in the input device 20. Examples thereof include information regarding a touch operation detected by the touch sensor 230 and information regarding movement of a hand detected by a motion sensor 240.

Furthermore, the display control unit 121 may control an operation position on a display screen of the display unit 160 according to line-of-sight information of a user detected by the line-of-sight detection unit 130. That is, the display control unit 121 can perform a pointing operation by a line-of-sight input. Here, the "line-of-sight information" is, for example, information indicating a direction of a line-of-sight of the user. The display control unit 121 recognizes a position of a line-of-sight center (gaze point) of the user on the display screen of the display unit 160 as the operation position on the basis of the line-of-sight direction of the user. Then, the display control unit 121 recognizes an image displayed at the operation position as an operation object, and executes control on the image according to the information regarding the operation input to be input by the input device 20. As described above, by directing a line-of-sight to a virtual object that is an operation object and then operating the input device 20 at hand, a user can perform an operation input (for example, a scroll operation or the like) to the optional virtual object. Such an operation method combining the line-of-sight information and the information regarding the operation input from the input device 20 may be used as, for example, an operation method mainly for a two-dimensional image (including the two-dimensional content described above). Specifically, description will be made later with reference to FIGS. 6 to 12. Furthermore, the display control unit 121 may perform vibration feedback using a vibration unit 250 provided in the input device 20 as feedback of an operation input using the input device 20 by the user.

On the other hand, as an operation method in a case where a virtual object is a three-dimensional image (including the three-dimensional object or the UI described above), a method of directly operating the virtual object and a method of remotely operating the virtual object are exemplified. Examples of the method of directly operating include a method of controlling display of a virtual object according to movement of a user touching, holding, or releasing the virtual object (see FIGS. 13 to 19). In this case, the display control unit 121 appropriately uses a position and movement of a hand or a finger of the user obtained by analyzing a captured image acquired by the outward camera 140 and information regarding an operation input received from the input device 20. Examples of the information regarding the operation input received from the input device 20 include information regarding a touch operation detected by the touch sensor 230, motion information detected by the motion sensor 240, a distance between the input device 20 and a thumb or a distance between the input device 20 and a predetermined joint portion detected by a distance sensor, and the like. Furthermore, the display control unit 121 may perform vibration feedback using the vibration unit 250 provided in the input device 20 as feedback of an operation input using the input device 20 by a user. Examples of the method of remotely operating include a method of displaying a pointer UI 366 that moves according to a direction of the input device 20 on the display unit 160 (see FIGS. 20 to 25). A user can perform an operation input to an optional virtual object by performing a touch operation or the like on the input device 20 in a state where the pointer UI 366 is placed on the virtual object by moving the input device 20 (the virtual object can be recognized as an operation object by the display control unit 121).

The various operation methods described above will be specifically described with reference to FIGS. 6 to 25.

Note that the control unit 120 may perform control of power ON/OFF, volume adjustment, display ON/OFF, and the like according to an operation input from the operation input unit 150 provided in the display device 10. Furthermore, the control unit 120 may perform audio output control from the audio output unit 170. Reproduction of audio in a case where a virtual object is a moving image, or the like is exemplified.

(Line-of-Sight Detection Unit 130)

The line-of-sight detection unit 130 is a line-of-sight information acquisition unit having a function of detecting (acquiring) information regarding a line-of-sight (line-of-sight information) of a user. The line-of-sight detection unit 130 may be an inward camera that captures an eye of a user when the display device 10 is mounted, or may be a myoelectric sensor that detects eye potential. The line-of-sight detection unit 130 detects, for example, a direction of a line-of-sight as the line-of-sight information on the basis of information acquired by various sensors. A method of detecting the line-of-sight information is not particularly limited.

(Outward Camera 140)

The outward camera 140 is an imaging unit provided in the display device 10 so as to capture a head direction of a user when the display device 10 is mounted. An angle of view of the outward camera 140 includes at least a visual field range (also referred to as a field of view). The outward camera 140 includes each of a lens system including an imaging lens, an aperture, a zoom lens, a focus lens, and the like, a drive system that causes the lens system to perform a focusing operation and a zooming operation, a solid-state imaging element array that performs photoelectric conversion on imaging light obtained by the lens system to generate an imaging signal, and the like. The solid-state imaging element array may be implemented by, for example, a charge coupled device (CCD) sensor array or a complementary metal oxide semiconductor (CMOS) sensor array.

(Operation Input Unit 150)

The operation input unit 150 receives an operation from a user, and outputs information regarding the received operation to the control unit 120. The operation input unit 150 can be implemented by, for example, a push button, a touch sensor, an optical sensor, or the like.

(Display Unit 160)

The display unit 160 is implemented by, as an example, a see-through type display. The see-through type display is a display capable of directly delivering light in the real space to an eye of a user. The user can directly and visually recognize the real space via the see-through type display. The see-through type display may be, for example, an optical see-through display. The optical see-through display can adopt a known form including a half mirror system, a light guide plate system, a retinal direct drawing system, and the like.

(Audio Output Unit 170)

The audio output unit 170 has a function of outputting audio. For example, the audio output unit 170 may be configured as a headphone, an earphone, or a bone conduction speaker.

(Storage Unit 180)

The storage unit 180 is implemented by a read only memory (ROM) that stores programs, operation parameters, and the like used for processing of the control unit 120, and a random access memory (RAM) that temporarily stores parameters and the like that change appropriately.

The configuration of the display device 10 according to the present embodiment has been specifically described above. Note that the configuration of the display device 10 is not limited to the example illustrated in FIG. 2. For example, all components of the configuration illustrated in FIG. 2 do not have to be included, and another component may be included. Furthermore, the display device 10 may include a plurality of devices. Furthermore, although not illustrated in FIG. 2, the display device 10 includes a power supply unit that supplies power to each configuration of the display device 10.

<2-2. Input Device 20>

The input device 20 includes a communication unit 210, a control unit 220, the touch sensor 230, the motion sensor 240, the vibration unit 250, and a storage unit 260. Note that the configuration illustrated in FIG. 1 is an example, and the configuration of the display device 10 is not limited thereto.

(Communication Unit 210)

The communication unit 210 is communicably connected to an external device in a wired or wireless manner to transmit and receive data. For example, the communication unit 210 can be communicably connected to the display device 10 by wireless communication such as Wi-Fi (registered trademark) or Bluetooth (registered trademark).

(Control Unit 220)

The control unit 220 functions as an arithmetic processing device and a control device, and controls overall operations in the input device 20 according to various programs. The control unit 220 is implemented by, for example, an electronic circuit such as a central processing unit (CPU) or a microprocessor. Furthermore, the control unit 220 may include a read only memory (ROM) that stores programs, operation parameters, and the like to be used, and a random access memory (RAM) that temporarily stores parameters and the like that change appropriately.

The control unit 220 performs control to transmit information detected by the touch sensor 230 and information detected by the motion sensor 240 from the communication unit 210 to the display device 10. These pieces of information (detection results) correspond to information regarding an operation input to the display device 10 performed by a user using the input device 20.

Furthermore, the control unit 220 according to the present embodiment also functions as a vibration control unit 221. The vibration control unit 221 performs vibration control of the vibration unit 250 according to a control signal received from the display device 10 by the communication unit 210. Such vibration control can be presented as, for example, feedback of an operation input by a user.

(Touch Sensor 230)

The touch sensor 230 has a function of detecting a touch operation by a user. The touch sensor 230 is provided on a surface of a main body portion of the input device 20 to be mounted on a finger of the user, at a position facing another finger different from the finger on which the input device 20 is to be mounted at the time of mounting. For example, in a case where the input device 20 is mounted on an index finger as illustrated in FIG. 1, since the touch sensor 230 is positioned at a position facing a thumb, the user can perform a touch operation on the touch sensor 230 with the thumb. Examples of the touch operation include a tap operation, a swipe operation, a hold operation (long push), and the like. Furthermore, examples of a system of the touch sensor include a resistive film system, a capacitance system, an ultrasonic system, an optical system, and the like, but any system may be used in the present embodiment. The touch sensor 230 may be provided in a single number or in multiple numbers.

(Motion Sensor 240)

The motion sensor 240 has a function of detecting movement of the input device 20 itself. For example, the motion sensor 240 may be a triaxial acceleration sensor and a triaxial gyro sensor. Furthermore, the motion sensor 240 may further include a geomagnetic sensor.

(Vibration Unit 250)

The vibration unit 250 has a function of presenting tactile information (tactile stimulation to skin). Note that a system of vibration is not particularly limited. The vibration unit 250 may be provided in a single number or in multiple numbers.

(Storage Unit 260)

The storage unit 260 is implemented by a read only memory (ROM) that stores programs, operation parameters, and the like used for processing of the control unit 220, and a random access memory (RAM) that temporarily stores parameters and the like that change appropriately.

The configuration of the input device 20 according to the present embodiment has been specifically described above. Note that the configuration of the input device 20 is not limited to the example illustrated in FIG. 2. For example, all components of the configuration illustrated in FIG. 2 do not have to be included, and another component may be included. For example, the input device 20 may include one or more other sensors. For example, the input device 20 may further include a distance sensor. The distance sensor may be an optical sensor (for example, a time of flight (ToF) system). Furthermore, although not illustrated in FIG. 2, the input device 20 includes a power supply unit that supplies power to each configuration of the input device 20.

Figure 3:
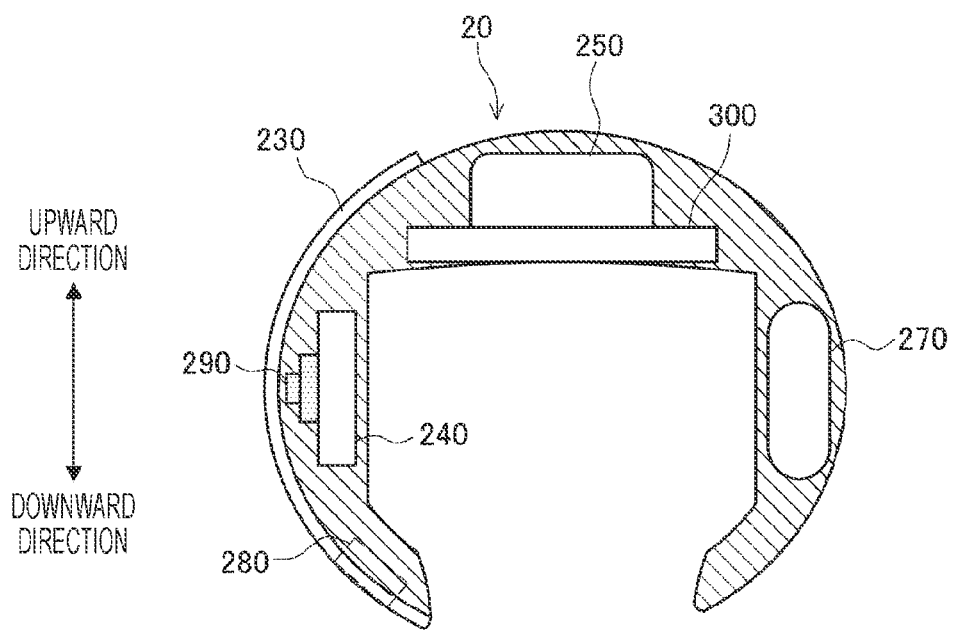
FIG. 3 is a simplified cross-sectional view illustrating an example of a structure of the input device according to the present embodiment.

Here, an example of a structure of the input device 20 according to the present embodiment will be described with reference to FIG. 3. FIG. 3 is a simplified cross-sectional view illustrating an example of the structure of the input device 20 according to the present embodiment. The input device 20 according to the present embodiment is formed in a shape that can be mounted on a finger. As an example, the input device 20 is formed in a ring shape. Note that the cross-sectional view illustrated in FIG. 3 is a view of the input device 20 as viewed from a direction in which a finger is passed.

The ring shape may be a shape that closes in a ring shape, or may be a shape that is partially opened and does not close in a ring shape (C-shaped ring) as illustrated in FIG. 3. By having a shape that does not close in a ring shape, it is also possible to cope with a slight difference in finger size. Furthermore, in order to cope with different sizes, a deformable portion may be included in a part of the main body portion. Details will be described later with reference to FIGS. 27 to 29.

The input device 20 may be formed on the assumption that the input device 20 is mounted on, for example, a base joint portion or a middle joint portion of an index finger.

Figure 4:
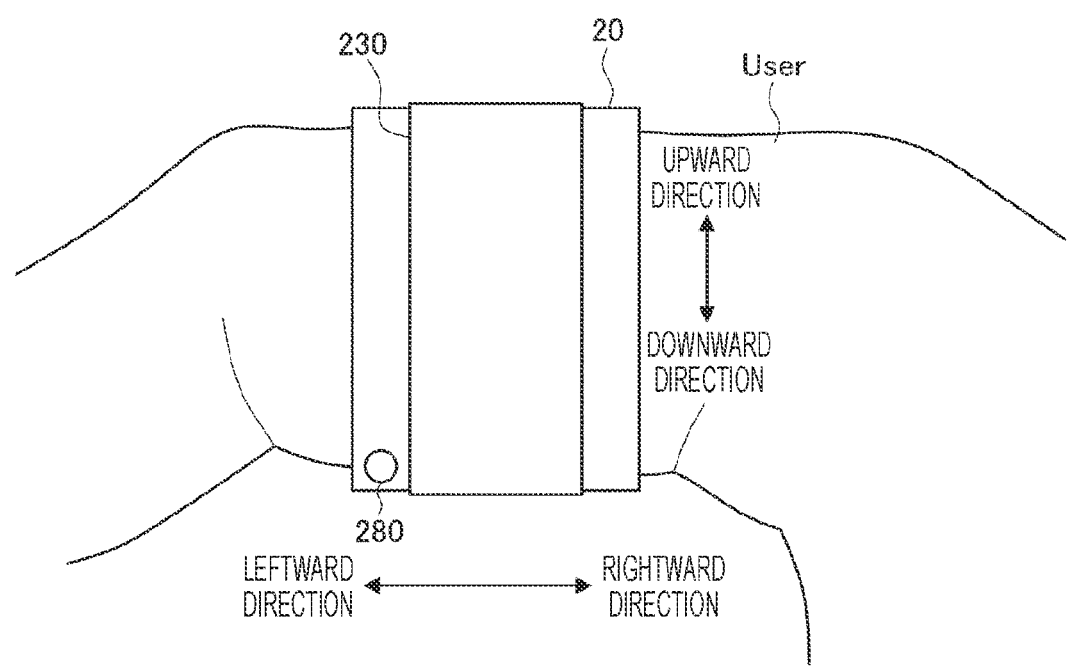
FIG. 4 is a view of the input device according to the present embodiment as viewed from a side surface.

As illustrated in FIG. 3, the touch sensor 230 is provided on a surface of the main body portion of the input device 20 at a position facing another finger different from a finger on which the input device 20 is mounted at the time of mounting. For example, in a case where the input device 20 is mounted on an index finger, it is assumed that a touch operation is performed by a thumb of the same hand. As illustrated in FIG. 3, the touch sensor 230 can be formed over a vertical direction on one side of the surface of the main body portion. FIG. 4 illustrates a view of the input device 20 as viewed from a side surface (a side on which the touch sensor 230 is provided). In FIG. 4, the input device 20 is mounted on a base joint portion of an index finger of a right hand. The touch sensor 230 is wide enough for enabling a swipe operation in upward, downward, leftward, and rightward directions with a thumb.

Furthermore, as illustrated in FIG. 3, the motion sensor 240 (for example, an acceleration sensor and a gyro sensor) is provided inside the main body portion of the input device

20, and movement (posture information) of the input device 20 itself can be detected. Note that an arrangement place of the motion sensor 240 is not particularly limited. For example, in the main body portion, the motion sensor 240 may be arranged on an upper side (a portion positioned on a back side of the finger when being mounted on the finger), may be arranged on a lower side (a portion positioned on a pad side of the finger when being mounted on the finger), or may be provided on either a left or right side (side portion).

Furthermore, as illustrated in FIG. 3, a push switch unit 290 may be arranged on a back side of the touch sensor 230. The push switch unit 290 can detect a push operation (click operation) of the touch sensor 230. Alternatively, a pressure sensor may be arranged on the back side of the touch sensor 230. The pressure sensor detects a pushing pressure on the touch sensor by, for example, the thumb of the user, and detects an ON operation when a detected value exceeds a preset threshold. At this time, control may be performed such that vibration feedback using the vibration unit 250 is returned to the user. With this arrangement, it is possible to implement a function corresponding to a push switch capable of freely changing a pushing pressure (hardness) and switch feeling according to preference of the user. Furthermore, in a state where the touch sensor does not detect touch of the user, the ON operation is not detected even when the detected pressure exceeds the threshold, so that it is possible to prevent the ON operation from being erroneously detected by a gripped object or the like other than the finger touching the touch sensor. Moreover, an analog value obtained by the pressure sensor can also be used for an analog amount operation such as a zoom operation of a display area according to the pressure value.

Furthermore, the main body portion of the input device 20 may be provided with a distance sensor 280. The distance sensor 280 measures a distance to another finger (for example, the thumb) or a distance to a predetermined joint (for example, a middle joint) of the finger on which the input device 20 is mounted. The distance sensor 280 may be, for example, a time of flight (ToF) system optical sensor. Furthermore, it is also possible to widen a detection range by arranging a plurality of the distance sensors 280.

Furthermore, the vibration unit 250 may be provided inside the main body portion of the input device 20. In the example illustrated in FIG. 3, the vibration unit 250 is provided on the upper side in the main body portion, but the present embodiment is not limited to this arrangement.

Furthermore, a unit portion 300 is provided inside the main body portion of the input device 20. The unit portion 300 can be formed by one or more electronic circuits that implement the control unit 220, the communication unit 210, and the storage unit 260. In the example illustrated in FIG. 3, the unit portion 300 is provided on the upper side in the main body portion, but the present embodiment is not limited to this arrangement.

Furthermore, a power supply unit 270 that supplies power to each configuration of the input device 20 is provided inside the main body portion of the input device 20. In the example illustrated in FIG. 3, the power supply unit 270 is provided on the right side of the main body portion, but the present embodiment is not limited to this arrangement. For example, in a case where the input device 20 is mounted on the index finger, it is desirable that the right side of the main body portion positioned between the index finger and a middle finger is thin. Therefore, it is also conceivable that the power supply unit 270 is arranged on the upper side in the main body portion. Furthermore, apart from the C-shaped configuration described above, the input device may have a ring-shaped component to be mounted on the finger, on which a component is arranged in an L shape on a back side of the index finger and the side surface facing the thumb, and to which the L-shaped component is fixed. In this case, it is desirable that the ring-shaped component is configured so as to be replaceable according to a finger size of the user. Moreover, it is possible to propose the stable input device that also follows a change in thickness around the finger (base joint portion) due to bending and stretching of the finger by using an elastic member for the ring-shaped component.

Furthermore, the main body portion of the input device 20 may be provided with a bent portion in which a substrate is not arranged inside, and this portion may have a plastically deformable structure, so that it is possible to cope with a difference in a finger size for each user. In the example illustrated in FIG. 3, for example, a curved portion between the upper portion and the side portion (right side/left side) of the main body portion of the input device 20 corresponds to the bent portion. In this case, for example, after or while the input device 20 is mounted, a user himself/herself pushes the bent portion of the main body portion from the outside, thereby plastically deforming the bent portion so that an appropriate pressure is applied to a finger, and a shape and a size can be adjusted. The bent portion (or the main body portion including the bent portion) may include, for example, a plastically deformable material such as an aluminum plate. Furthermore, the bent portions may be provided on both the left and right sides, or may be provided only on one side.

Although an example of the structure of the input device 20 has been described above, the arrangement of each configuration according to the present embodiment is not limited thereto.

3. Operation Processing

Figure 5:
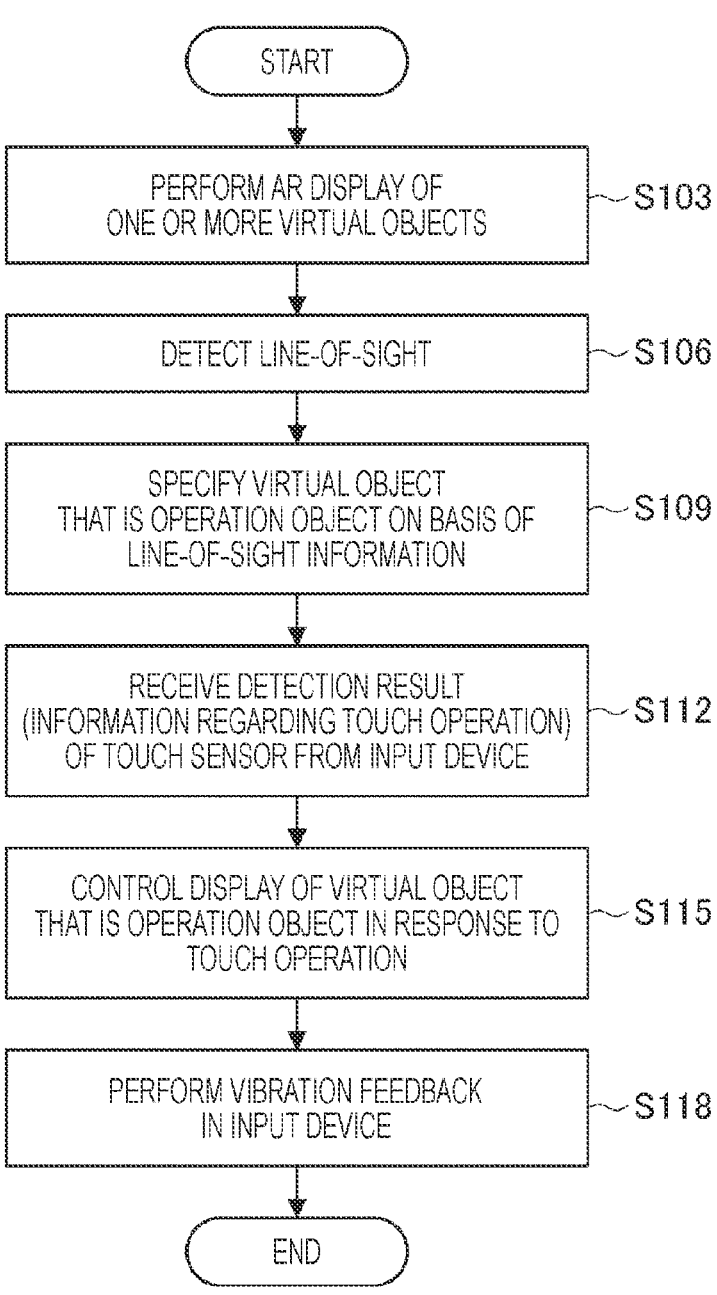
FIG. 5 is a flowchart illustrating an example of a flow of operation processing of the information processing system according to the present embodiment.

Subsequently, with reference to FIG. 5, a flow of operation processing of the information processing system according to the present embodiment will be described. FIG. 5 is a flowchart illustrating an example of the flow of the operation processing of the information processing system according to the present embodiment.

As illustrated in FIG. 5, first, the display control unit 121 of the display device 10 performs AR display of one or more virtual objects on the display unit 160 (Step S103). The AR display indicates a case where the virtual object is superimposed and displayed on the real space in the optical see-through type display unit 160. Furthermore, here, it is assumed that the virtual object as a two-dimensional image is displayed as an example.

Next, in the display device 10, the line-of-sight detection unit 130 detects a line-of-sight of a user (Step S106).

Next, the display control unit 121 of the display device 10 specifies a virtual object that is an operation object on the basis of line-of-sight information (Step S109). Specifically, the display control unit 121 recognizes, as an operation object, a virtual object (or a part of the virtual object) viewed by the user (for example, which is displayed at a gaze point on the display screen of the display unit 160) on the basis of a direction of the line-of-sight indicated by the line-of-sight information.

Next, in the display device 10, the communication unit 110 receives a detection result (information regarding a touch operation) of the touch sensor 230 from the input device 20 (Step S112).

Next, the display control unit 121 of the display device 10 controls display of the virtual object that is the operation object in response to the touch operation (Step S115). For example, the display control unit 121 performs determination control in response to a tap operation or performs scroll control in response to a swipe operation.

Then, the control unit 120 of the display device 10 performs control to perform vibration feedback in the input device 20 as necessary (Step S118). That is, the control unit 120 transmits a vibration control signal to the input device 20, and vibration is presented in the vibration unit 250 of the input device 20.

An example of the operation processing according to the present embodiment has been described above. Note that the processing of each step illustrated in FIG. 3 is not limited to the order illustrated in FIG. 3. For example, Steps S106 to S109 and Step S112 can be continuously performed in parallel.

Furthermore, here, a case is assumed where the virtual object is a two-dimensional image, and as one of the operation methods in that case, the operation method of combining pointing by line-of-sight detection and an instruction of an operation by a touch operation has been described. In addition, an operation method of combining pointing by line-of-sight detection and a detection result of the motion sensor 240 can be considered. For example, by twisting a wrist left and right in a state where the input device 20 is mounted on a finger, zoom control (enlargement/reduction) of an operation object can be performed. Furthermore, in a case where the virtual object is a three-dimensional image, it is also possible to directly operate or remotely operate the virtual object with a finger or a hand on which the input device 20 is mounted. In this case, for example, each of an analysis result of a captured image captured by the outward camera 140, a detection result of the motion sensor 240, a detection result of the distance sensor provided in the input device 20, a detection result of the touch sensor 230, and the like may be appropriately used. Details of each operation method will be described later with reference to FIGS. 6 to 26.

4. Operation Method

Subsequently, a specific operation method using the input device 20 will be described. Hereinafter, each of a case where a virtual object is a two-dimensional image and a case where a virtual object is a three-dimensional image will be described.

<4-1. Operation Method for Two-Dimensional Image>

Figure 6:
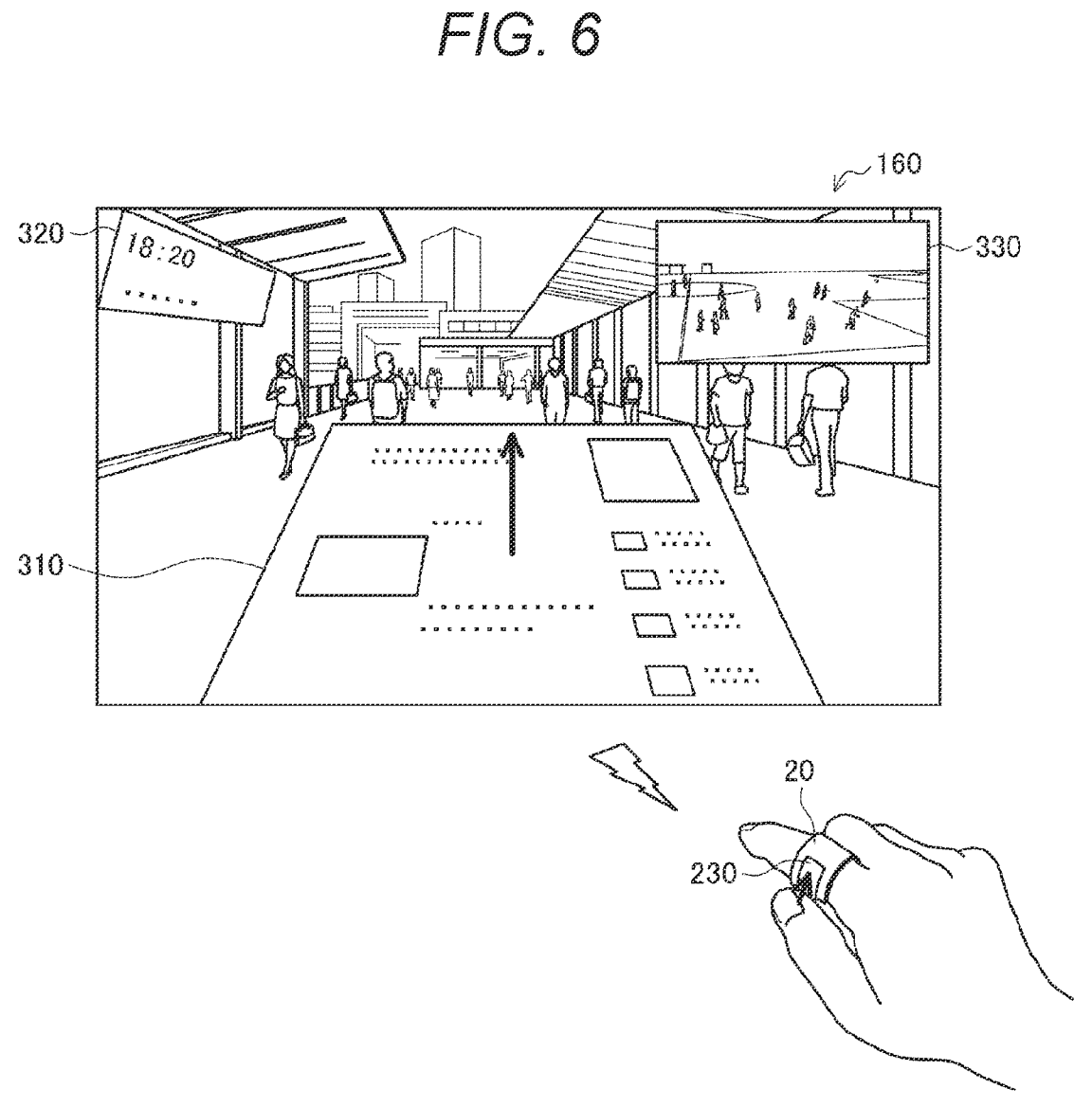

FIG. 6 is a view for describing an example of an operation method for a two-dimensional image according to the present embodiment. For example, as illustrated in FIG. 6, in the optical see-through type display unit 160, virtual objects 310 to 330 as two-dimensional images are displayed in a field of view of a user.

The virtual objects 310 to 330 are panels (two-dimensional images) displaying two-dimensional content. For example, a panel displaying time-related information is displayed in an upper left area of the field of view, a panel displaying moving image information such as sports broadcasting is displayed in an upper right area, and a panel displaying a Web browser screen is displayed in a front area. Furthermore, a non-display area is provided in a part of the field of view (for example, a central area of the display unit 160) so as to be able to avoid collision with a surrounding person or object while walking or the like. Display positions of these virtual objects 310 to 330 (the respective panels displaying the two-dimensional content) displayed on the display unit 160 are not localized on the real space, and are displayed with reference to a coordinate axis of the display device 10 itself so that relative display positions do not change even when a head moves. With this arrangement, a user can perform an action of viewing a website while walking.

Determination control, scroll control, and the like for each of the virtual objects 310 to 330 can be performed by detection of a line-of-sight of a user and an operation of the input device 20. For example, when the user directs a line-of-sight (gazes at) the virtual object 310, the virtual object 310 is recognized as an operation object (a cursor is not particularly displayed), and in this state, the user performs a swipe operation on the touch sensor 230 of the input device 20 in the upward direction (see FIG. 4), whereby scroll control of a web browser displayed as the virtual object 310 can be performed in the upward direction in FIG. 6. In addition to the scroll control in response to the swipe operation in the vertical direction, a swipe operation in a horizontal direction (see FIG. 4) can be performed in the touch sensor 230. In this case, in a case where the operation object is a Web browser, the scroll control may be performed to the left and right, and in a case where the operation object is a moving image, the swipe operation to the left and right may be recognized as a command, and a channel of the moving image may be switched. Whether analog screen scroll control or command control is performed for the same swipe operation depends on setting of an image that is the operation object.

As described above, in the present embodiment, since a method of raising an arm forward and directly touching an object is not used, it is possible to avoid a physical load of an operation and an unnatural impression given to a surrounding person.

Hereinafter, another method of an operation input of a two-dimensional image combining line-of-sight detection and an operation of the input device 20 will be described.

(Scroll Control and Fine Adjustment by Line-of-Sight)

Figure 7:
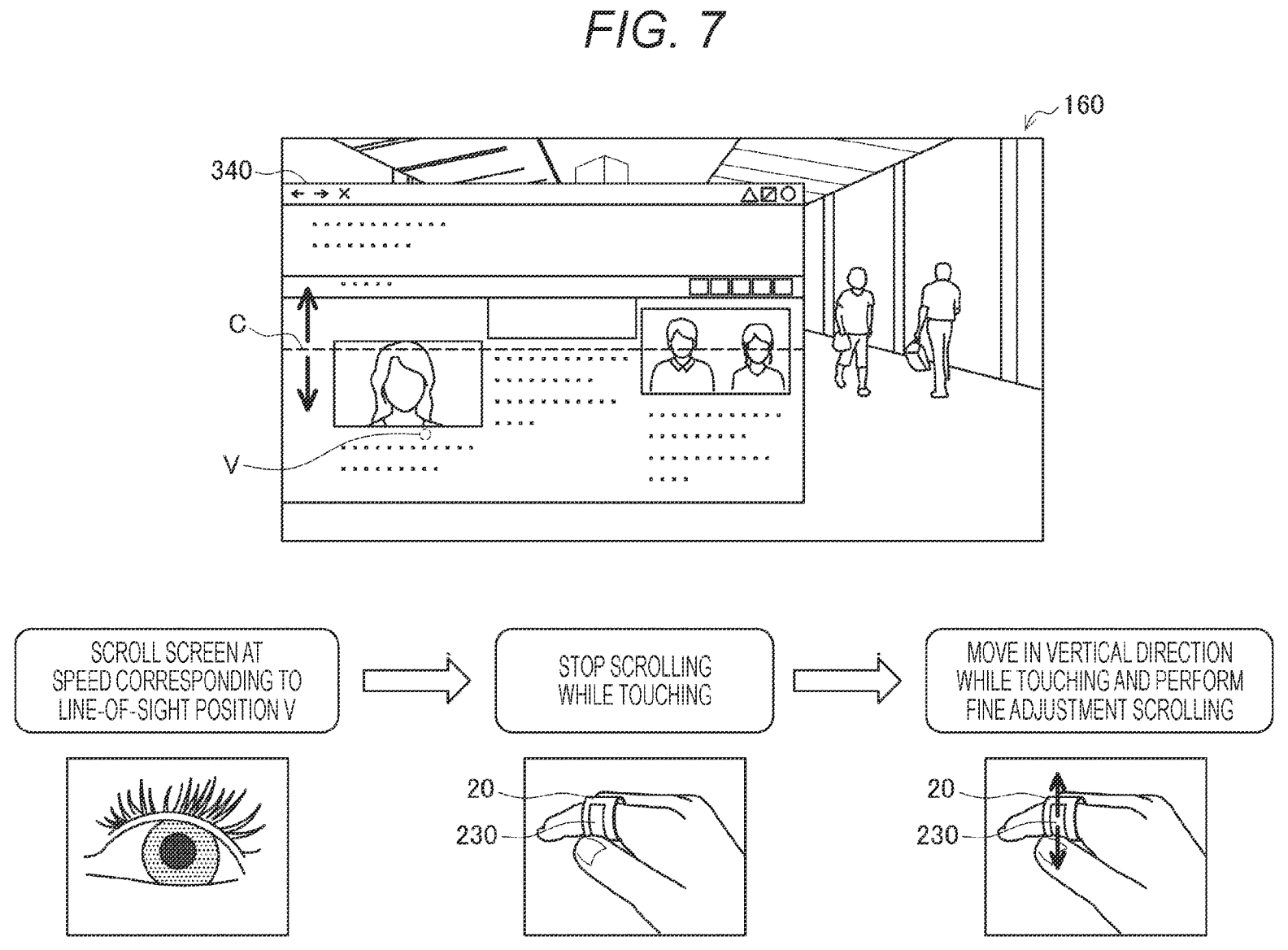

FIG. 7 is a view for describing an example of an operation method for the two-dimensional image according to the present embodiment. In FIG. 7, a virtual object 340 that is a panel displaying a web browser screen is displayed on the display unit 160. As illustrated in FIG. 7, the display control unit 121 executes screen scrolling at a speed corresponding to a line-of-sight position V by detection of a line-of-sight of a user, for example. For example, the display control unit 121 performs the screen scrolling faster in the downward direction as the line-of-sight position V moves in the downward direction from a screen center line C, and performs the screen scrolling faster in the upward direction as the line-of-sight position V moves in the upward direction from the screen center line C. The speed of the screen scrolling is made faster as a distance from the screen center line C increases. With this arrangement, a user can quickly view the entire screen and search for a place to read.

Next, the display control unit 121 performs control to stop the screen scrolling while the touch sensor 230 is touched in the input device 20. With this arrangement, the user can stop the screen scrolling at an optional place while quickly viewing the entire screen.

Then, in a case where an operation of moving in the vertical direction while the touch sensor 230 is being touched with a finger is performed in the input device 20, the display control unit 121 performs screen fine adjustment scrolling (slow scrolling). With this arrangement, the user can scroll slowly at an optional timing while reading text of the web browser. Note that the scroll control in the horizontal direction can be performed similarly. Furthermore, upward, downward, leftward, and rightward in the touch sensor 230 of the input device 20 are as illustrated in FIG. 4. That is, a back side of a hand when the input device 20 is worn on a finger is defined as the upward direction, and in a case where the input device 20 is mounted on a right hand, a root direction of the finger is defined as the rightward direction. Such upward, downward, leftward, and rightward directions correspond to the upward, downward, leftward, and rightward directions on a Web browser screen.
(Determination Control by Tap Operation)

FIG. 8 is a view for describing an example of an operation method for the two-dimensional image according to the present embodiment. The display control unit 121 can recognize a virtual object that is an operation object on the basis of line-of-sight detection by the line-of-sight detection unit 130, and further perform determination control in response to a tap operation on the input device 20. For example, as illustrated on the left in FIG. 8, the display control unit 121 first recognizes an operation object from the line-of-sight position V (corresponding to a gaze point) by line-of-sight detection (at this time, a cursor may not be displayed). In this case, a display area 342 of the virtual object 340 that is the panel displaying the Web browser screen can be recognized as the operation object. Next, as illustrated on the right in FIG. 8, when a tap operation (or pushing of the push switch unit 290) is performed on the input device 20, the display control unit 121 performs determination control. In the determination control, for example, screen transition to a link destination (a Web page of an article body) associated with the display area 342 is performed.

In a case where an operation object is large or in a case where accuracy of line-of-sight detection is sufficient, fine adjustment of an operation position is unnecessary, and thus, it can be considered to execute the operation of one action as described above to further reduce an operation load.
(UI Display of Tap Portion)

In the example described above, user interface (UI) display of a tap portion is not performed, but the present embodiment is not limited thereto, and the UI display may be temporarily performed at the moment of tapping. With this arrangement, it is possible to explicitly feed back an operation position to a user.

Figure 9:
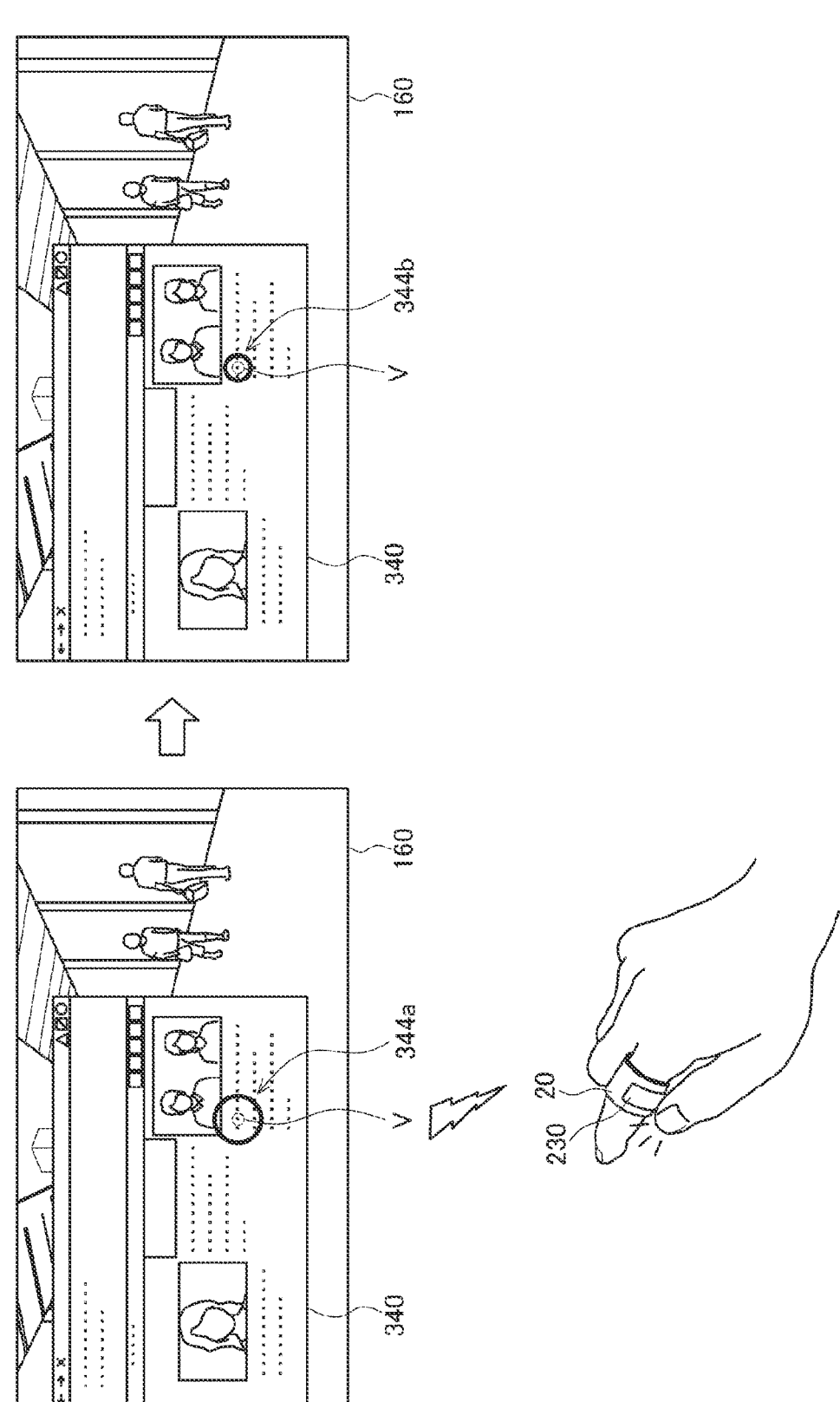
FIG. 9 is a view for describing UI display in an operation for the two-dimensional image according to the present embodiment.

FIG. 9 is a view for describing UI display in an operation for the two-dimensional image according to the present embodiment. For example, as illustrated on the left in FIG. 9, when a user performs a tap operation at a certain place, the display control unit 121 displays ring-shaped UI display 344a at an operation position (line-of-sight position V), and next, as illustrated on the right in FIG. 9, performs control to make the circle small and disappear in a short time. As described above, by performing the UI display for a moment in response to the tap operation, the user can explicitly recognize the operation position. Note that the method of the UI display is not limited to the example illustrated in FIG. 9. For example, the display control unit 121 may highlight, in a short time, a link area (a display area in which a link is set, for example, the display area 342 illustrated on the right in FIG. 8) selected by the tap operation.
(Adjustment Mode of Operation Position)

Furthermore, there is a case where fine adjustment of an operation position is required according to a situation, such as a case where an operation object is small or a case where accuracy of line-of-sight detection is insufficient. The operation position is a position of the operation object indicated by the line-of-sight position V (gaze position) by the line-of-sight detection. A position adjustment mode using the input device 20 will be described with reference to FIG. 10.

Figure 10:
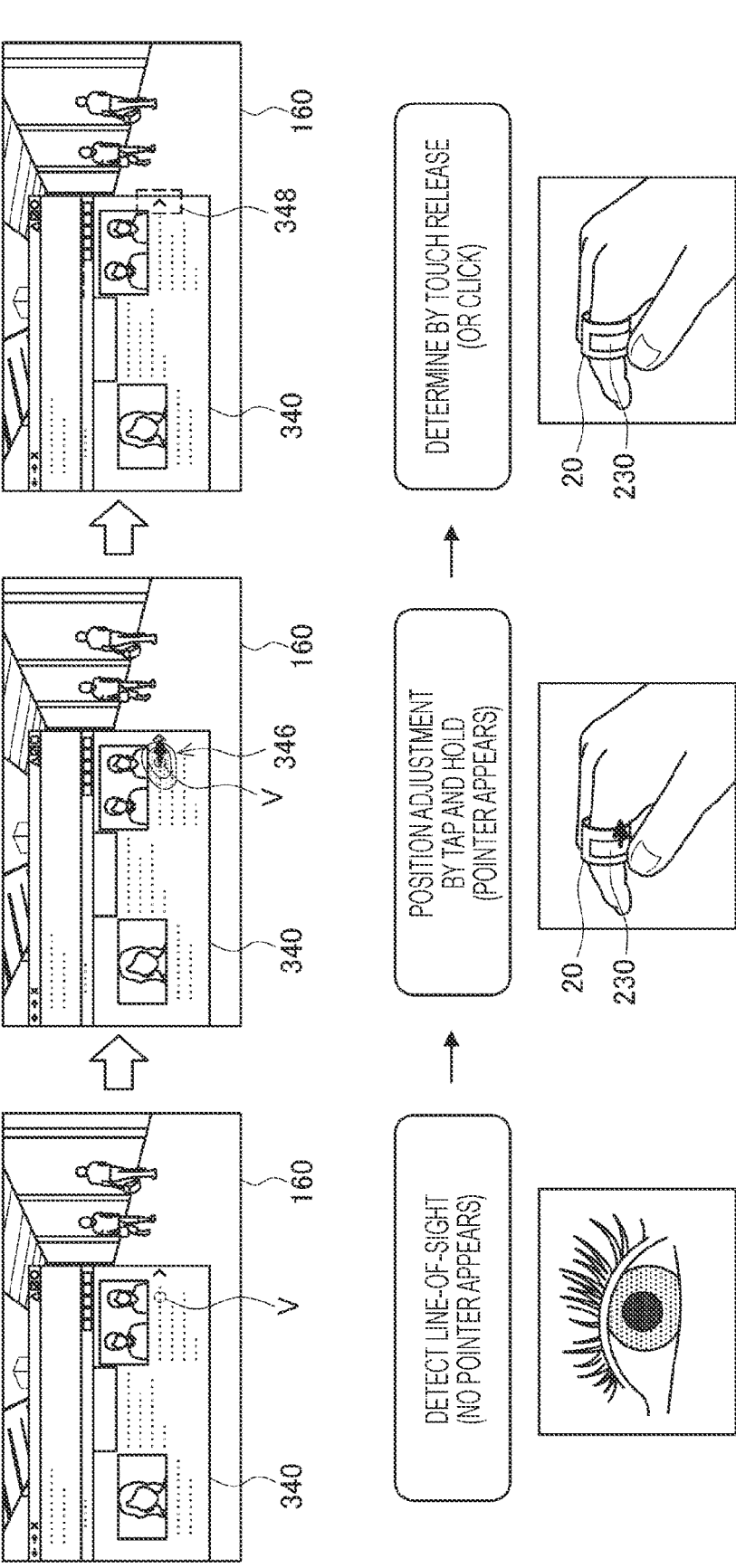
FIG. 10 is a view for describing an example (position adjustment mode) of an operation method for the two-dimensional image according to the present embodiment.

FIG. 10 is a view for describing an example (position adjustment mode) of an operation method for the two-dimensional image according to the present embodiment. First, as illustrated on the left in FIG. 10, the display control unit 121 recognizes the line-of-sight position V (operation position) by detection of a line-of-sight of a user (at this time, no pointer appears). Next, as illustrated in the center in FIG. 10, in a case where the user performs a tap and hold operation on the touch sensor 230 in the input device 20, the display control unit 121 displays a pointer 346 (an example of the UI display) and enters the position adjustment mode. At this time, the display control unit 121 moves the pointer 346 according to movement (movement to upward, downward, leftward, and rightward) of a finger on the touch sensor 230. With this arrangement, even in a case where an operation object is small or accuracy of line-of-sight detection is insufficient, it is possible to perform fine position adjustment while visually recognizing the pointer 346 by an operation using the touch sensor 230 of the input device 20. Then, as illustrated on the right in FIG. 10, the display control unit 121 performs determination control by touch release in which a finger is released from the touch sensor 230, a click operation of pushing the push switch unit 290 provided on a back of the touch sensor 230, or the like.
Regarding Coordinate Axis Here, a relationship between a direction of a touch operation and a movement direction of a pointer in the position adjustment mode as described with reference to FIG. 10 will be described with reference to FIGS. 11 and 12.

Figure 11:
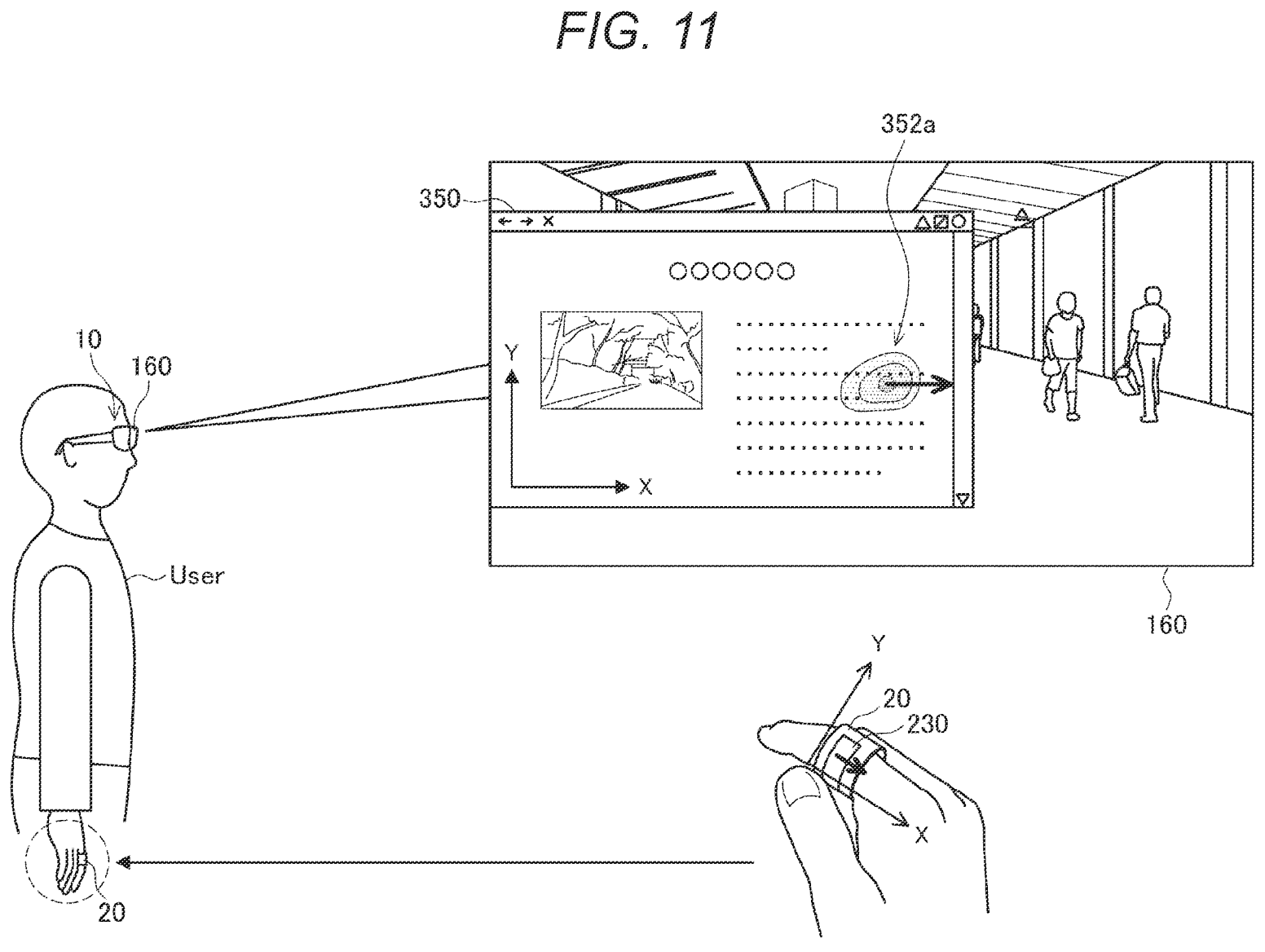

FIG. 11 is a view for describing an example of the relationship between the direction of the touch operation and the movement direction of the pointer in the position adjustment mode according to the present embodiment. As one method, for example, as illustrated in FIG. 11, a coordinate axis of the touch sensor 230 (touch pad) provided in the input device 20 is set to match a coordinate axis of the input device 20 itself. That is, an X axis in the touch operation of the touch sensor 230 matches a Z axis of the input device 20 itself described later with reference to FIG. 21, and a Y axis in the touch operation matches a Y axis of the input device 20 itself. Then, the display control unit 121 moves a pointer 352a by matching the coordinate axis of the touch operation and a coordinate axis on a screen in a virtual object 350. With such coordinate setting, a user can intuitively perform an operation.

Figure 12:
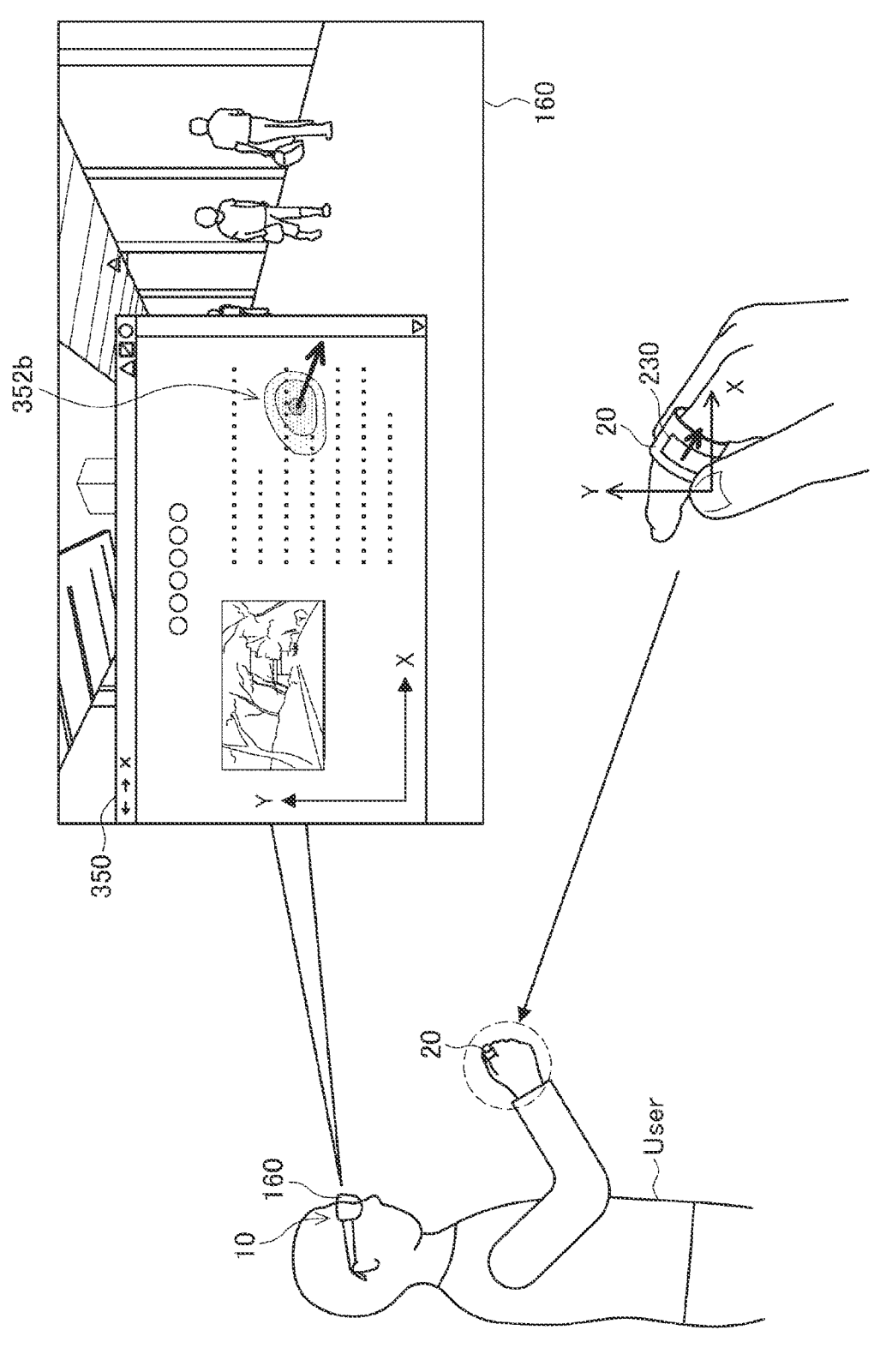
FIG. 12 is a view for describing an example of the relationship between the direction of the touch operation and the movement direction of the pointer in the position adjustment mode according to the present embodiment.

In the example with reference to FIG. 11, a case is mainly assumed where a user mainly performs a touch operation in a state where an arm is lowered, but the present embodiment is not limited thereto, and a case is also assumed where a user performs a touch operation by raising an arm as illustrated in FIG. 12. In this case, by adjusting the coordinate axis of the touch operation, directions of the display system and the operation system may be brought close to each other, and an intuitive operation may be implemented.

FIG. 12 is a view for describing an example of the relationship between the direction of the touch operation and the movement direction of the pointer in the position adjustment mode according to the present embodiment. As illustrated in FIG. 12, in a case where a user performs a touch operation by raising an arm, the display control unit 121 rotationally offsets the coordinate axis of the touch sensor 230 (touch pad) of the input device 20 from the coordinate axis of the input device 20 itself. Specifically, as illustrated in FIG. 12, the X and Y axes of the touch operation are rotated by, for example, +45 degrees around an X-axis direction of the input device 20 itself (see FIG. 21). Then, the display control unit 121 moves a pointer 352b by matching the rotationally offset coordinate axis of the touch operation and the coordinate axis on the screen in the virtual object 350.

With such coordinate axis setting, for example, a user ergonomically and naturally moves a thumb (only by movement of a root joint of the thumb) in the horizontal direction (X-axis direction of the touch operation illustrated in FIG. 12), so that the pointer 352b also moves in the horizontal direction on the screen. Alternatively, it is also possible to make it possible to always select whether to perform the operation as illustrated in FIG. 11 or the operation as illustrated in FIG. 12 regardless of a raise operation of an arm or the like by a setting operation of the user himself/herself.

Note that, also in the screen scroll control in response to a touch operation (swipe operation) described with reference to FIGS. 6 and 7, coordinate axis setting of the touch operation is similarly performed. Basically, the coordinate axis setting described with reference to FIG. 11 may be performed on the assumption of an operation in a state where an arm is lowered. Furthermore, when it is detected that the user raises the arm, the coordinate axis setting described with reference to FIG. 12 may be performed.

(Zoom In/Zoom Out Operation)

Examples of an operation method of display magnification of an operation object include a method of performing an operation of twisting a hand on which the input device 20 is mounted to the left and right in a state where a line-of-sight is directed to an object Web browser screen, detecting such an operation (operation of twisting a wrist to the left/right) by the motion sensor 240 of the input device 20, and controlling enlargement/reduction according to rotation angle displacement by the display control unit 121. The display control unit 121 may perform control to, for example, enlarge the display magnification of the object in increments of 1% each time the wrist is rotated outward once (to a back side of a hand, for example, in the rightward direction in a case where the input device 20 is mounted on a right hand). In this case, for example, by tapping and holding the touch sensor, the enlargement/reduction operation by twisting the wrist may be activated.

<4-2. Operation Method for Three-Dimensional Image>

Next, an operation method in a case where a virtual object is a three-dimensional image or is a two-dimensional image directly operated as in a touch panel operation will be described. In the case of the three-dimensional image, a method of directly operating the virtual object by hand and a method of remotely operating the virtual object by using a pointer UI are exemplified.

(4-2-1. Direct Operation of Virtual Object)

As an example of visual information presented to a user by using the display unit 160, a virtual object generated by a three-dimensional image is exemplified. The virtual object as the three-dimensional image is superimposed and displayed on the real space in the display unit 160. Furthermore, the virtual object may be localized and displayed on the real space, or may be displayed without being localized.

In a case where such a virtual object as the three-dimensional image is displayed at a position where the user can reach by hand (in a case where a display position of the virtual object is set close to the user), the user can directly operate the object virtual object by tapping, holding, and the like with a finger on which the input device 20 is mounted. Hereinafter, description will be made with reference to FIGS. 13 to 19.

Fingertip Tap to Three-Dimensional UI

Figure 13:
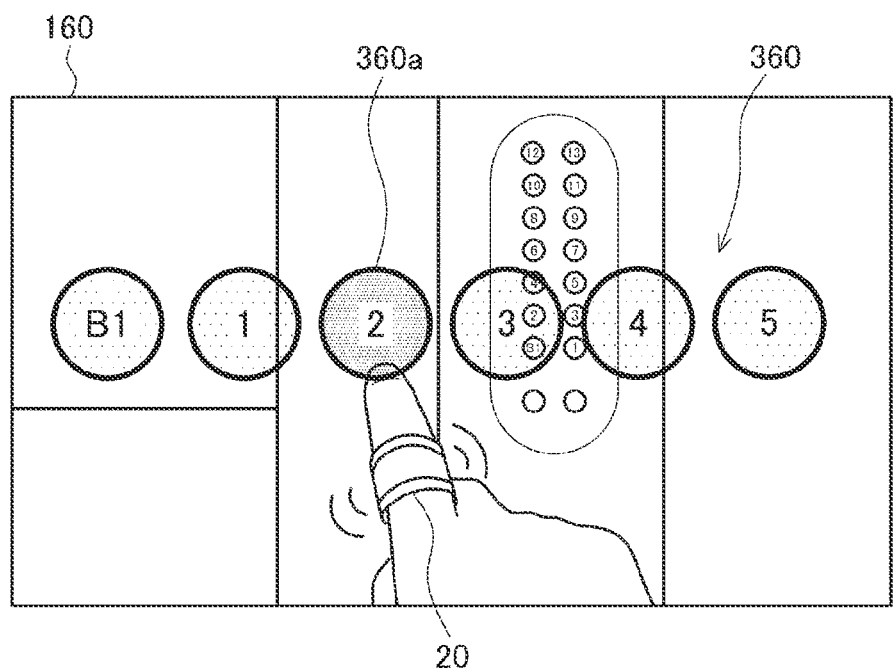
FIG. 13 is a view for describing a tap operation of a three-dimensional UI with a fingertip according to the present embodiment.

FIG. 13 is a view for describing a tap operation of a three-dimensional UI with a fingertip according to the present embodiment. As illustrated in FIG. 13, as an example of a three-dimensional image, for example, there is a three-dimensional UI image 360 displayed on the display unit 160 in an elevator. The control unit 120 analyzes a captured image of a field of view of a user, which is captured by the outward camera 140 (or analyzes a detection result by a depth sensor), and recognizes a fingertip position (or a position of the input device 20). Then, when the fingertip position touches the three-dimensional UI image 360 (depth information may be considered), the control unit 120 receives an operation input to the three-dimensional UI image 360. For example, in the example illustrated in FIG. 13, when it is recognized that the fingertip touches a button image 360a of "second floor" in the three-dimensional UI image 360 indicating floor number buttons of the elevator, the control unit 120 transmits information indicating that the second floor is selected to a system on the elevator side. Furthermore, the control unit 120 may perform operation feedback by sound, display, vibration, or the like. For example, the control unit 120 may control the display control unit 121 to change color of the button image 360a. Furthermore, the control unit 120 may control the vibration unit 250 of the input device 20 to perform tactile feedback (vibration such as click) to the user. With such tactile feedback, it is possible to generate a sense of substance in the operation on the virtual object. In this case, for example, when the button image is directly operated with a finger, it is conceivable to give tactile feedback in each of a case where the button is turned on and a case where the button is turned off, and to make a difference in vibration pattern between the both. Furthermore, it is similarly conceivable to always give another tactile feedback while the button is turned on. By such control, it is possible to improve a sense of substance of an operation sense and operability of the button that is continuously pushed and operated, such as an open button of the elevator, for example.

Robust Detection of Fingertip Position

Note that, in "detection of a fingertip position" using the outward camera 140 and the depth sensor provided in the display device 10, a fingertip may not be seen depending on a direction of a hand and an angle of a finger, and accuracy may be deteriorated. Thus, for example, a marker for recognition may be given to the input device 20, the marker may be detected by the outward camera 140, and a fingertip position may be estimated by the control unit 120. Furthermore, a distance sensor is further provided in the input device 20, and a distance to a predetermined joint portion (joint) of a finger on which the input device 20 is mounted is detected. In this case, the control unit 120 can estimate a fingertip position on the basis of a position of the input device 20 detected by the marker or the like and a distance from the position to the predetermined joint portion (joint).

Figure 14:
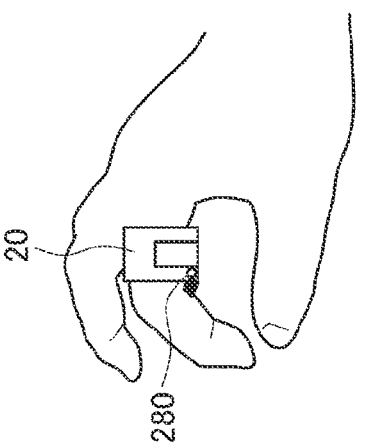
FIG. 14 is a view for describing robust detection of a fingertip position by using a distance sensor according to the present embodiment.

FIG. 14 is a view for describing robust detection of a fingertip position by using the distance sensor according to the present embodiment. As illustrated in FIG. 14, for example, a distance from the input device 20 to a middle joint portion of a finger is measured by the distance sensor (uniaxial) provided in input device 20. Note that calibration for each individual is first performed. As illustrated in FIG. 14, a distal joint portion and the middle joint portion of the finger move in conjunction with each other. For example, the longer a distance D from the input device 20 to the middle joint portion, the farther the position of the fingertip, which is a distal end of the distal joint portion of the finger, becomes. With this arrangement, the control unit 120 can estimate the fingertip position from the position of the input device 20 and distance information to the middle joint.

Operation of Holding and Releasing

The control unit 120 can detect an operation of holding and releasing a virtual object with a finger on which the input device 20 is mounted on the basis of analysis of a captured image of the outward camera 140 and a detection result by the motion sensor 240 of the input device 20.

Figure 15:
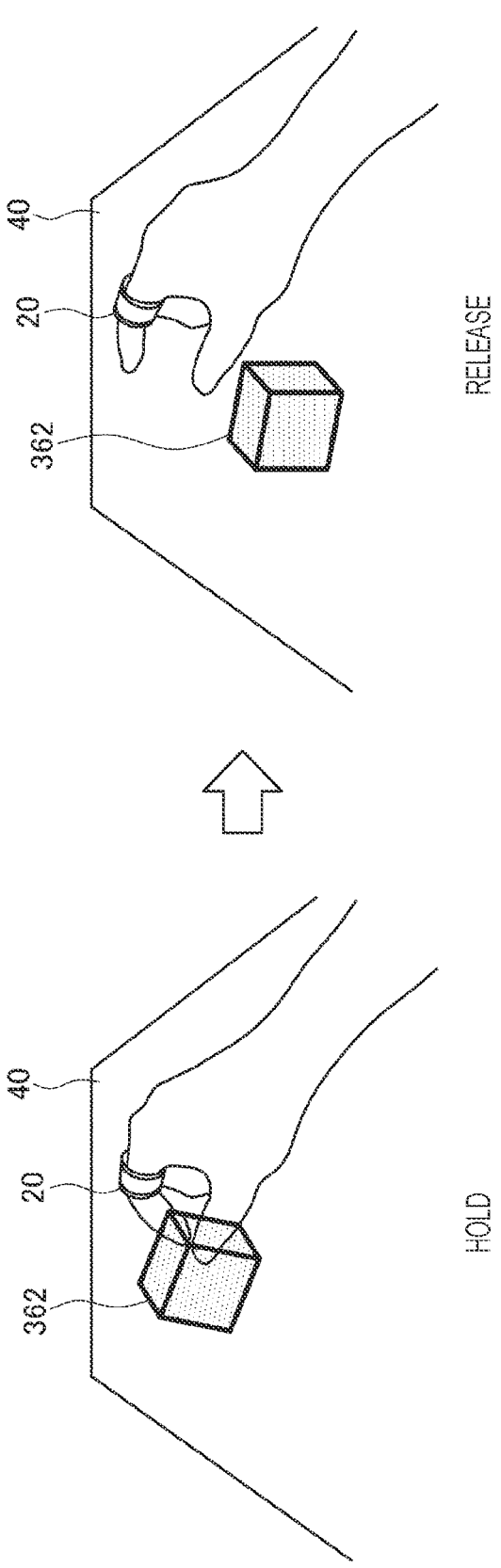
FIG. 15 is a view for describing an operation of holding and releasing a virtual object according to the present embodiment.

FIG. 15 is a view for describing the operation of holding and releasing the virtual object according to the present embodiment. As illustrated in FIG. 15, in the present embodiment, for example, an operation of directly holding and releasing a virtual object 362 (three-dimensional image) localized on a table 40 of the real space can be performed.

Since fingers (for example, an index finger and a thumb) collide with each other to generate vibration, the operation of holding is easily detected by an acceleration sensor that is an example of the motion sensor 240 provided in the input device 20. On the other hand, it may be difficult to determine whether the operation of releasing is an operation of releasing a finger or an operation of moving an entire hand (moving from a wrist while in the holding state) only from movement of the input device 20 alone, and thus, for example, the following method is exemplified.

Figure 16:
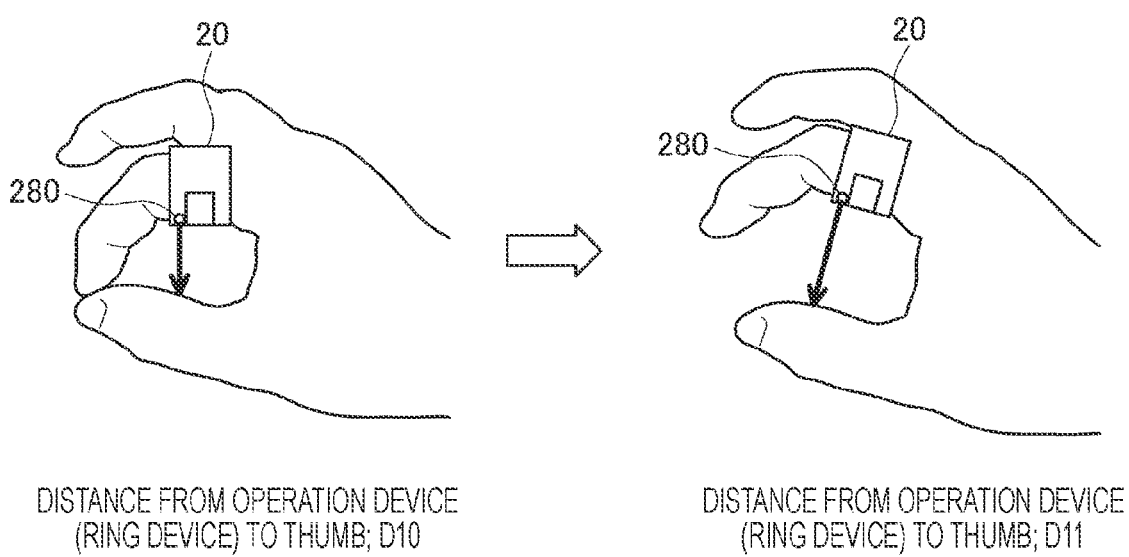
FIG. 16 is a view for describing an example of detection of an operation of speaking according to the present embodiment.

As a first solution method, detection of the operation of "releasing" by a change in a value of the uniaxial distance sensor directed to a thumb is exemplified. FIG. 16 is a view for describing an example of detection of an operation of speaking according to the present embodiment. As illustrated in FIG. 16, the distance sensor 280 (uniaxial) is provided in the input device 20 to measure a distance to a thumb. With this arrangement, for example, the control unit 120 can determine a holding state in the case of a distance D10 and a released state in the case of a distance D11. Note that calibration for each individual is first performed. Alternatively, it is also conceivable to measure a value D of the uniaxial distance sensor, record, as Dt, a value at a timing when an operation of "holding" by the acceleration sensor described above is detected, and thereafter detect an operation of "releasing" at a timing when the value D satisfies $D>Dt+\Delta D$. With this arrangement, it is possible to eliminate an event in which the distance D at a time of holding changes for each operation even for the same user in each operation of holding and releasing and determination is not stable. In the above description, $\Delta D$ is a value for securing robustness and stability of detection, and is set to, for example, 10% of Dt, or the like.

As a second solution method, determination together with a result of recognition of a hand by the outward camera 140 of the display device 10 is exemplified. For example, in a case where a position of a back of the hand is not moved and the motion sensor 240 of the input device 20 detects movement of the input device 20 in the upward direction, the control unit 120 determines that an operation of "releasing" is performed.

Figure 17:
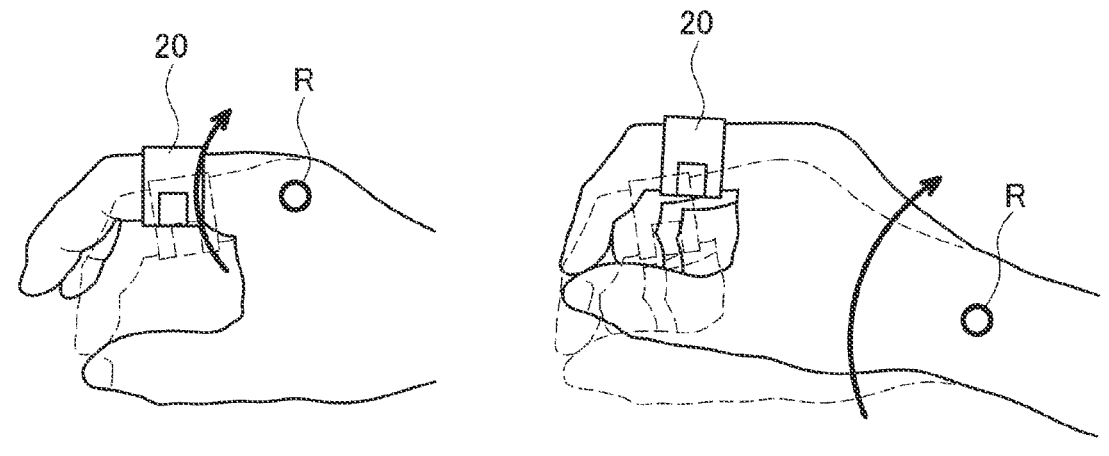
FIG. 17 is a view for describing determination of the operation of releasing by prediction of a rotation center according to the present embodiment.

As a third solution method, a method is exemplified in which the control unit 120 predicts a rotation center on the basis of a detection result of the motion sensor 240 of the input device 20, and determines an operation of "releasing" according to a position of the rotation center. FIG. 17 is a view for describing determination of the operation of releasing by prediction of the rotation center according to the present embodiment. For example, as illustrated on the left in FIG. 17, in a case where the input device 20 itself moves in the upward direction, a rotation center R predicted by a detection result of the motion sensor 240 is positioned around a root of an index finger. Therefore, in this case, the control unit 120 determines that the operation of "releasing" is performed. On the other hand, as illustrated on the right in FIG. 17, in a case where the rotation center R is at a place farther than the root of the index finger (for example, a wrist or an elbow), the control unit 120 determines that the operation of "releasing" is not performed. Note that the prediction of the rotation center can be performed on the basis of, for example, detection results of a gyro sensor and an acceleration sensor which are examples of the motion sensor 240. Furthermore, by arranging a plurality of gyro sensors and acceleration sensors inside the input device 20 (for example, each of the plurality of gyro sensors and acceleration sensors are arranged on an upper portion and a lower portion of the input device 20), the control unit 120 can make determination with higher accuracy.

Prevention of Detection Accuracy Deterioration

In the detection of holding and releasing described above, detection accuracy may be affected depending on a manner of mounting the input device 20. As described above, the motion sensor 240 and the distance sensor 280 (optical sensor) may be used in the detection of holding and releasing. The motion sensor 240 detects, for example, vibration when an index finger and a thumb come into contact with each other. For example, the control unit 120 observes signals of x, y, and z axes detected from the motion sensor 240, and detects the contact by using the values themselves or values to which a bandpass filter or a norm is applied. Note that, in the present embodiment, it has been described that contact between fingers is detected as the operation of "holding", but it may be detected as a tap operation.

Here, when the input device 20 is mounted on a finger, the motion sensor 240 has a high degree of freedom for a mounting angle, but when the input device 20 is not in close contact with the finger, there is a possibility that vibration of contact through the finger is attenuated. Even when the mounting angle is an optional angle, the contact can be detected without any problem by applying rotation processing to a value of the sensor or performing identification using a feature amount independent of the angle.

Thus, in a case where the mounting of the input device 20 is loose and the detection by the motion sensor 240 is not successful, the control unit 120 instructs a user to re-mount the input device 20 so as to bring the input device 20 into closer contact. As an instruction method, guidance is displayed on the display unit 160, the input device 20 is vibrated, or sound is presented. For determination that detection of the vibration is not sufficient, for example, an amplitude of shake of the terminal may be viewed, or vibration data when the terminal is loose may be learned in advance and compared. Furthermore, calibration such as always tapping fingers once at a time of mounting the input device 20 may be performed, and re-mounting may be instructed by an amplitude thereof.

On the other hand, for the distance sensor 280 mainly used to measure a distance between a finger and a finger, there is no problem even when the input device 20 is not in close contact with the finger (detection accuracy is not significantly deteriorated), but there is an allowable mounting angle. The distance sensor 280 corresponds to, for example, a distance sensor (depth sensor) such as a uniaxial ToF, another ToF, a millimeter wave radar, a camera, or an IR sensor. For example, in the case of the uniaxial ToF, since a recognizable range is limited in terms of a solid angle (for example, less than 60 degrees in a plane angle), in a case where a user does not mount the input device 20 in correct posture, it is difficult to measure a distance to a thumb as illustrated in FIG. 16 (for example, in a case where the distance sensor 280 is not mounted at a position directed to the thumb, the distance to the thumb cannot be measured).

On the other hand, a method of providing a plurality of the distance sensors 280 in the input device 20 so that the input device 20 can be used with high accuracy without re-mounting as much as possible is exemplified. For example, by providing uniaxial distance sensors at a plurality of places of the input device 20, the distance to the thumb can be measured even in a case where the input device 20 is mounted in any direction.

In a case where the distance from the thumb cannot be obtained even in a case where a plurality of distance sensors is provided, the control unit 120 instructs the user to perform re-mounting. For example, the control unit 120 may display guidance on the display unit 160 so that the input device 20 is mounted in correct posture. Furthermore, the input device 20 may perform guidance by display means (not illustrated) such as LED display of the input device 20. The fact that the distance to the thumb cannot be obtained indicates that the distance cannot be measured in a case where, for example, the distance sensor 280 cannot observe approach to the thumb although the motion sensor 240 detects contact between the fingers (tap operation).

Then, in a case where the user does not follow the instruction of re-mounting and the distance to the thumb cannot be measured by the plurality of distance sensors 280, the control unit 120 may detect an operation of holding and releasing by using only a detection result of the motion sensor 240. Furthermore, the control unit 120 may assign, for example, bringing the fingers into contact with each other twice (tapping twice) as an alternative to the operation of "releasing".

On the other hand, in a case where the user does not follow the instruction of re-mounting and the mounting of the input device 20 remains loose, and a detection result of the motion sensor 240 cannot be used, the control unit 120 may detect the operation of holding and releasing in a pseudo manner only by the distance sensor 280.

As described above, even in a case where a user does not follow re-mounting, the control unit 120 can ensure operability by appropriately selecting a sensor to be used for recognition.

Three-Dimensional AR Operation by Touch Operation

Figure 18:
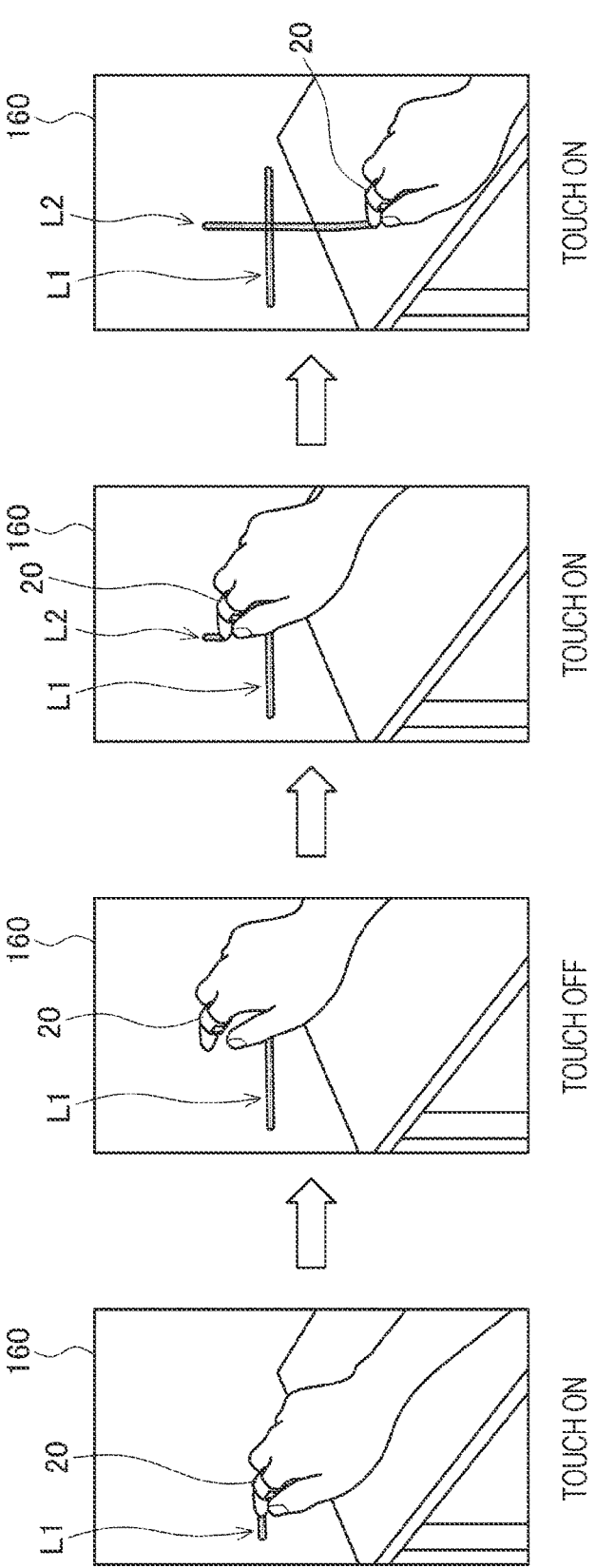
FIG. 18 is a view for describing AR drawing of characters and pictures using a fingertip according to the present embodiment.

Subsequently, implementation of various operations using the touch sensor 230 of the input device 20 will be described.
(1) AR Drawing of Characters and Pictures Using Fingertip The control unit 120 of the display device 10 performs control to draw a line or the like from a tip of an index finger (performs AR display of an image such as the line) on the display unit 160 in the case of a state where the touch sensor 230 is touched with a thumb (touch ON), and stop the drawing in a state where the touch sensor 230 is not touched with the thumb (touch OFF). The image such as a line is a virtual object generated by three-dimensional information. The image such as a line may or may not be localized on the real space. As described above, a fingertip position can be estimated on the basis of analysis of a captured image captured by the outward camera 140 of the display device 10 or measurement of a distance (a distance from the input device 20 to a middle joint portion) by the distance sensor provided in the input device 20. The display device 10 may perform operation feedback by sound or vibration. FIG. 18 is a view for describing AR drawing of characters and pictures using a fingertip according to the present embodiment. As illustrated in FIG. 18, the control unit 120 performs AR display (AR drawing) of a line image L1 following a position of a fingertip on the display unit 160 in the case of touch ON in the input device 20, and stops the drawing in the case of touch OFF.

Thickness, a type, color, and the like of the line can also be controlled by an operation from the input device 20. For example, the control unit 120 may detect force of pushing the input device 20 with a thumb and change the thickness or the like of the line according to the pushing pressure. The input device 20 is provided with, for example, a touch sensor with a pressure detection function, another pressure sensor, and the like.

Furthermore, since it may be difficult to operate a timing of touch ON/OFF as intended for "sweeping" or the like when writing a character, the control unit 120 may determine a stop position of the drawing by automatically discriminating "sweeping" or the like from a shape of the character and information regarding movement of the input device 20.
(2) Determination of "Holding/Releasing"

Figure 19:
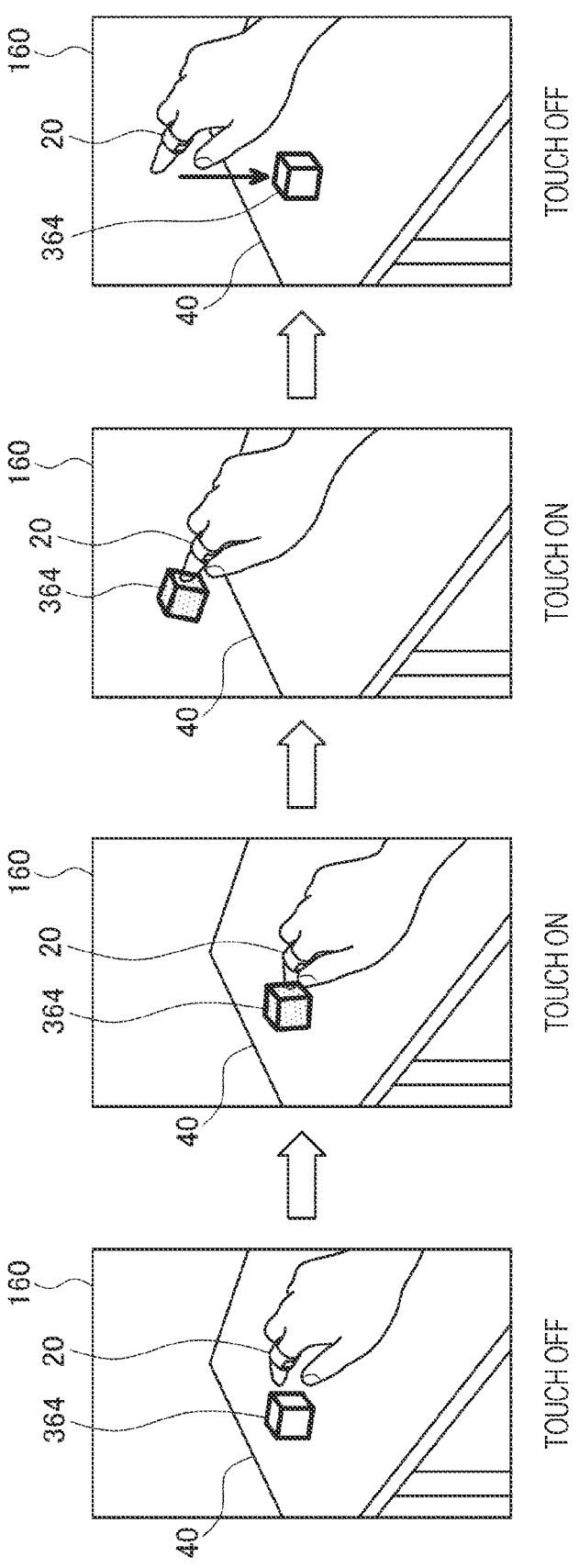
FIG. 19 is a view for describing an operation of holding and releasing a virtual object by a touch operation according to the present embodiment.

The control unit 120 may perform control to make a state where a virtual object can be held in a case where the touch sensor 230 is touched with a thumb (touch ON), and a state where the virtual object is released in a case where the touch sensor 230 is not touched with the thumb (touch OFF). FIG. 19 is a view for describing an operation of holding and releasing a virtual object by a touch operation according to the present embodiment. For example, as illustrated on the left in FIG. 19, the control unit 120 displays a virtual object 364 localized on the real space (for example, on the table 40) on the display unit 160, and further recognizes, by the outward camera 140, a position of a finger (or a hand) on which the input device 20 is mounted. The virtual object 364 is, for example, a three-dimensional CG image. Next, in a case where touch ON is detected by the input device 20, it is recognized that the virtual object 364 is in the state of being held by a user, and display of the virtual object 364 is controlled. Specifically, as illustrated in FIG. 19, the control unit 120 performs control to cause a display position and posture of the virtual object 364 to follow a change in a position of a fingertip. Furthermore, the control unit 120 may perform operation feedback by changing color of the virtual object 364. Furthermore, the control unit 120 may perform operation feedback by sound or vibration. Then, in a case where touch OFF (release of the touched thumb) is detected by the input device 20, the control unit 120 recognizes the state of release, and performs control to release the virtual object 364 from the hand as illustrated on the right in FIG. 19. In the example illustrated on the right in FIG. 19, the control unit 120 performs display control in which the virtual object 364 released from the hand falls onto the table 40 in the real space according to a parameter set in the virtual object 364.

Which of the various operations described above is performed may be distinguished by a type of the touch operation. For example, any operation (AR drawing, an operation of holding, and the like) may be distinguished by selectively using "touch", "touch hold", "tap and hold", and the like. Furthermore, it may be distinguished by a touch position or pressure. For example, AR drawing may be performed in a case where a lower portion of the touch sensor 230 is touched, and an operation of holding may be performed in a case where an upper portion is touched.
(4-2-2. Remote Operation of Virtual Object)

Subsequently, a case will be described where a virtual object displayed at a place where a hand cannot reach is remotely operated by a pointer UI operated by the input device 20. Furthermore, it is also possible to hold and move the virtual object that the pointer UI touches by performing a touch operation or a switch operation by the input device 20.

Figure 20:
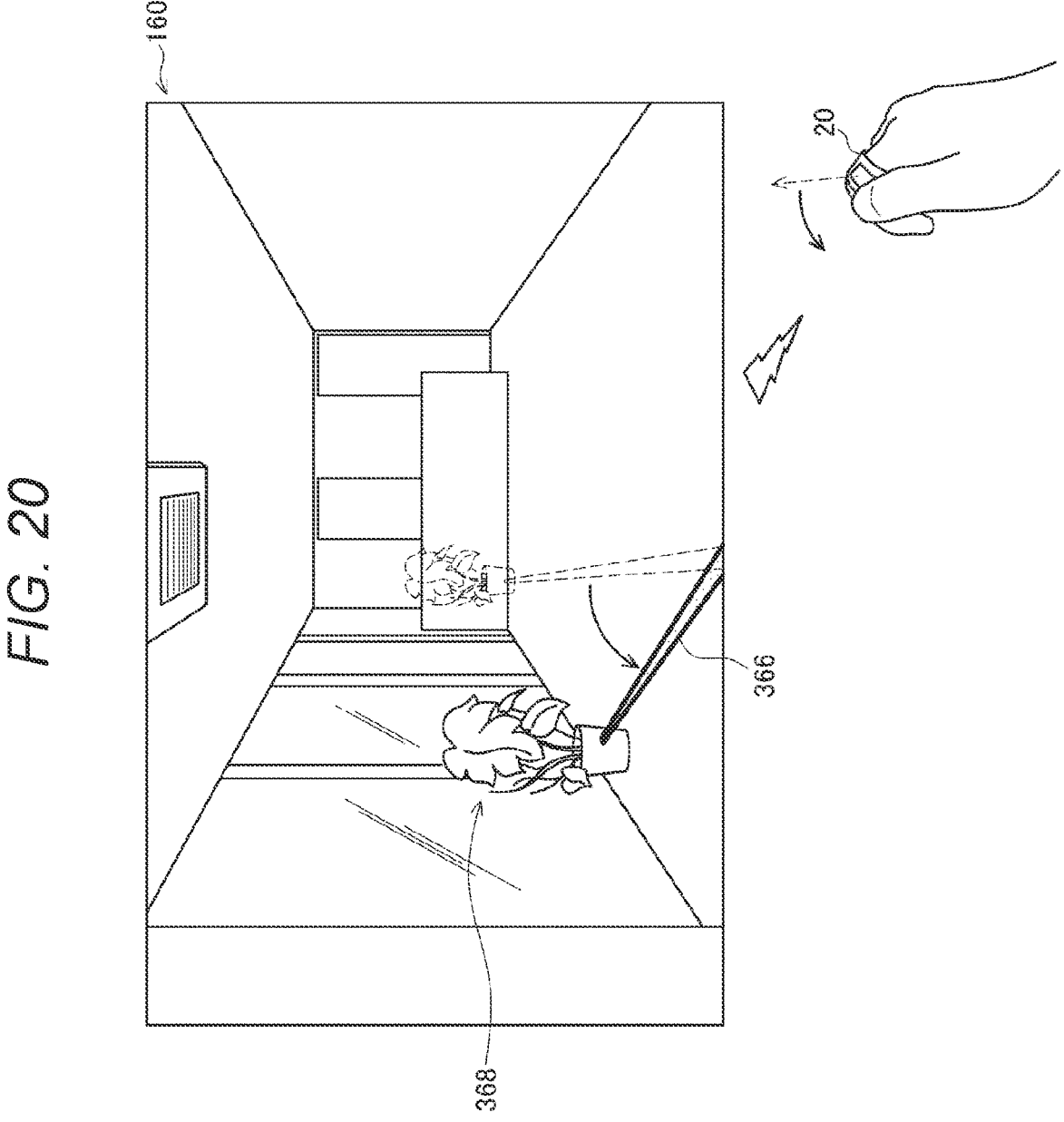
FIG. 20 is a view for describing a remote operation of a virtual object according to the present embodiment.

FIG. 20 is a view for describing a remote operation of a virtual object according to the present embodiment. As illustrated in FIG. 20, for example, in the display unit 160, when a virtual object 368 that is a three-dimensional object is localized on the real space, a user can move the virtual object 368 by using the pointer UI 366 that is a linear UI like a laser and that moves according to a direction of the input device 20. In the example illustrated in FIG. 20, a case is assumed where, in order to consider interior decoration of a room, arrangement consideration is performed while viewing the virtual object 368 that is a foliage plant generated by three-dimensional CG data through the display unit 160 of the display device 10.

Figure 21:
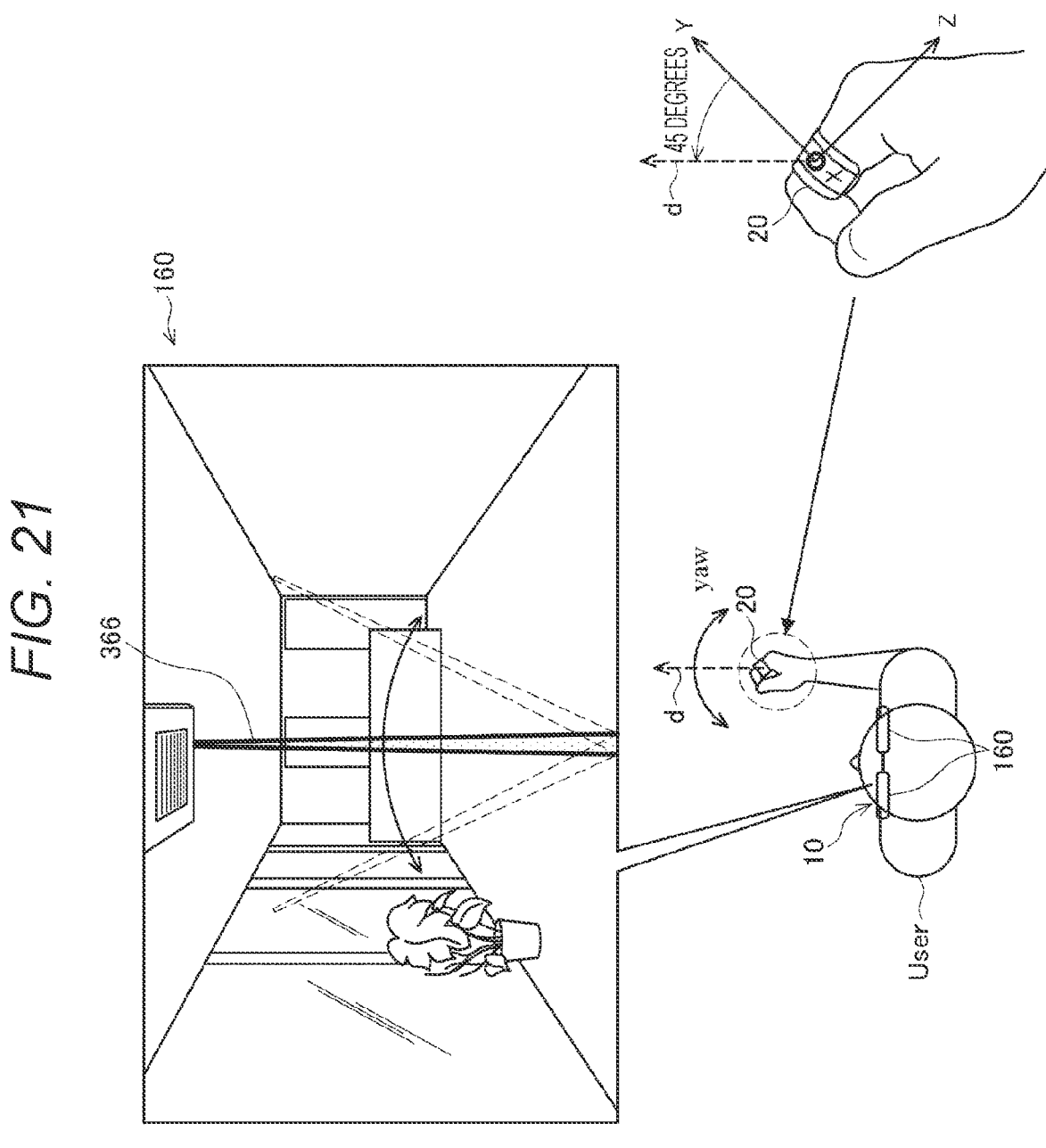
FIG. 21 is a view for describing movement of a pointer UI according to movement of the input device in a Yaw direction according to the present embodiment.
Figure 22:
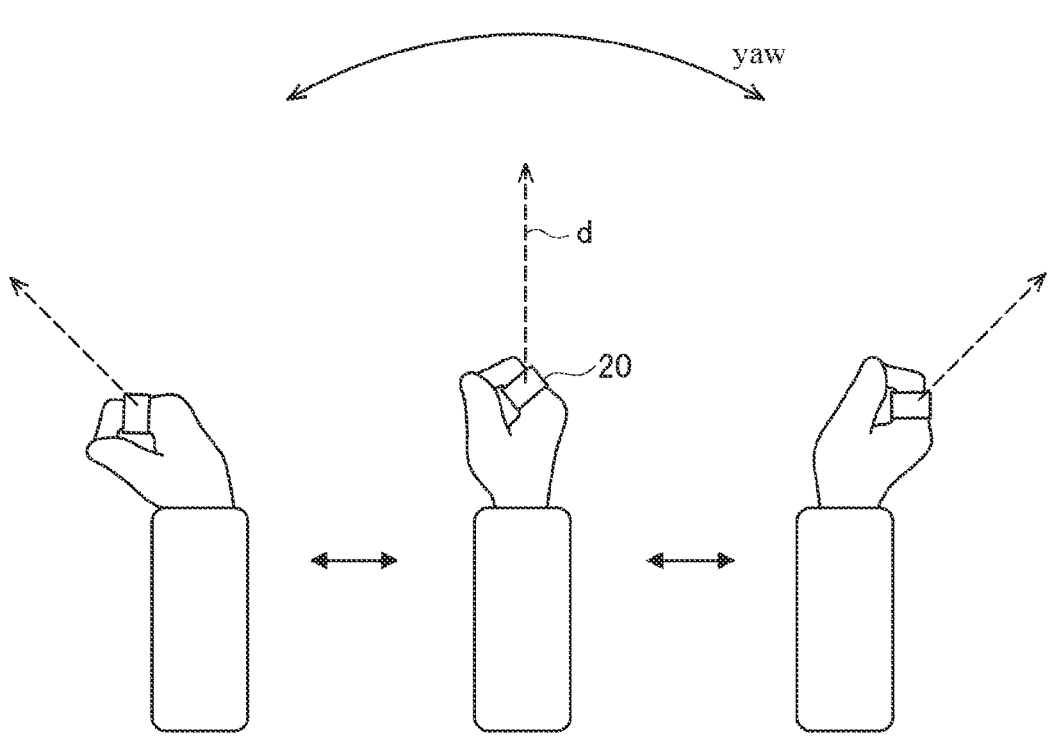
FIG. 22 is a view for describing a direction of the pointer UI according to the present embodiment.

The pointer UI 366 is subjected to display control so as to incline to the left and right according to posture of the input device 20 with, for example, a center of a lower side of the display unit 160 as a base point. The posture of the input device 20 (posture in Yaw and Pitch directions relative to the ground) can be acquired on the basis of detection results of an acceleration sensor, a gyro sensor, and a geomagnetic sensor that are examples of the motion sensor 240. Note that the motion sensor 240 provided in the input device 20 can detect posture information of three degrees of freedom (3 DOF) (Roll direction in addition to the Yaw and the Pitch described above), but since it is difficult to detect XYZ position coordinates of the input device 20 relative to the display device 10, the base point of the pointer UI is fixed at, for example, one portion in the center of the lower side of the display unit 160 as illustrated in FIG. 21. Note that it is also possible to detect the XYZ position coordinates of the input device 20 relative to the display device 10 by providing a two-dimensional marker or the like in the input device 20 and detecting the marker by a camera provided in the display device 10, and display the pointer UI with the detected position as the base point.

By performing a touch operation on the input device 20 in a state where the pointer UI 366 is placed on the virtual object 368, a user can hold the virtual object 368 that a hand cannot directly reach and move the virtual object 368 to an optional place.

Furthermore, a length of the pointer UI 366 may be initially set to, for example, 5 m or the like. Furthermore, in a case where there is a virtual object or a real object that can be remotely operated in a length direction of the pointer UI 366, the control unit 120 may appropriately change the length to a length that reaches a position thereof. Furthermore, in a case where there is a virtual object or a real object within 5 m described above, a display length of the pointer UI may be limited to the position thereof.
Regarding Display ON/OFF of Pointer UI The control unit 120 may display the pointer UI 366 only while a user touches the touch sensor 230 of the input device 20.

Furthermore, the pointer UI 366 may be displayed by performing a predetermined operation such as a double tap, a triple tap, or a long touch (long push) of the touch sensor 230, or a push operation (click operation of pushing the push switch unit 290 provided on the back side of the touch sensor 230), a double click operation, or a long click operation of the switch, so as to be separated from a scroll operation or the like on a two-dimensional image as described above.

Alternatively, the control unit 120 may cause the pointer UI 366 to appear in a case where a predetermined operation such as a swipe operation of the touch sensor 230 of the input device 20 in a positive direction of the Y axis (see FIG. 21) of the input device 20 is performed in a state where there is no virtual object (Web browser screen or the like) scrollable in a line-of-sight direction of a user. Furthermore, the control unit 120 may hide the pointer UI 366 in a case where a predetermined operation such as a swipe operation in a negative direction of the Y axis of the input device 20 is performed.

Furthermore, the control unit 120 may display the pointer UI 366 in a case where a virtual object that can be remotely operated is displayed in an approximate direction indicated by the input device 20, or may display the pointer UI 366 when a touch operation is performed on the input device 20 in such a situation.

Furthermore, the control unit 120 may display the pointer UI 366 in a case where a virtual object that can be remotely operated is displayed in a line-of-sight direction of a user, or may display the pointer UI 366 when a touch operation is performed on the input device 20 in such a situation.

Furthermore, the control unit 120 may display the pointer UI 366 in a case where a user raises an arm in a state where the input device 20 mounted thereon (in a case where the arm is raised in the Pitch direction vertical to the ground).
Regarding Feedback A user controls a direction of the pointer UI 366 by changing posture of the input device 20, and performs pointing by, for example, aligning the pointer UI 366 with the virtual object 368 as a three-dimensional CG image of a foliage plant or the like. In this case, when the pointer UI 366 is placed on the virtual object 368 that can be remotely operated, the control unit 120 changes display of the virtual object 368 (for example, changes a luminance value, adds a shadow, surrounds with a frame, blinks once, or the like) to allow the user to recognize that focus is on. Furthermore, the control unit 120 may further perform feedback by sound or vibration. For example, vibration is generated in the input device 20 at the moment when the virtual object 368 is focused, so that a sense of substance can be generated.
Regarding Operation of Holding and Releasing When a touch operation or a push operation of the switch (switch ON) is performed on the input device 20 in a state where the virtual object 368 is focused, the control unit 120 recognizes that an object is in a state of being held, and performs display control such that the virtual object 368 follows the pointer UI 366 (control close to a drag operation using a mouse).

Furthermore, when a touch release operation, an operation of pushing the switch again, or an operation of ending the pushing (switch OFF) is performed, the control unit 120 recognizes that the object is in a state of being released, and performs control to keep a display position of the virtual object 368 at a separated place. Note that the push operation is not limited to the operation of the push switch unit 290. For example, it may be determined that the push operation is performed in a case where a value of the pressure sensor provided in the input device 20 exceeds a threshold. Also in the case of using the pressure sensor, when the push operation ON/OFF is determined, an operation sense can be improved by performing tactile feedback by the vibration unit 250.
Regarding Posture of Input Device 20 and Direction of Pointer UI 366

The control unit 120 performs control to reflect, in a direction of the pointer UI 366, posture of the input device 20 in the Pitch direction (vertical) and the Yaw direction (horizontal) relative to the ground. Note that operation inputs using the input device 20 are two axes (Yaw, Pitch), but for example, by setting a virtual object to be constrained to movement on the ground in the real space, movement in two directions (left and right and front and back) can be implemented for the inputs of the two axes. That is, movement in a depth direction can be implemented by moving a virtual object front and back (front and back with respect to a user) with respect to a Pitch operation (vertical direction relative to the ground).

FIG. 21 is a view for describing movement of the pointer UI 366 according to movement of the input device 20 in the Yaw direction according to the present embodiment. As illustrated in FIG. 21, for example, when a user moves the input device 20 in the Yaw direction that is movement in a horizontal direction relative to the ground in a state where an arm is raised forward, display control to the left and right is performed on a tip of the pointer UI 366 displayed on the display unit 160. As described above, the base point (start point) of the pointer UI 366 is fixed to the center of the lower side of the display unit 160.

Figure 23:
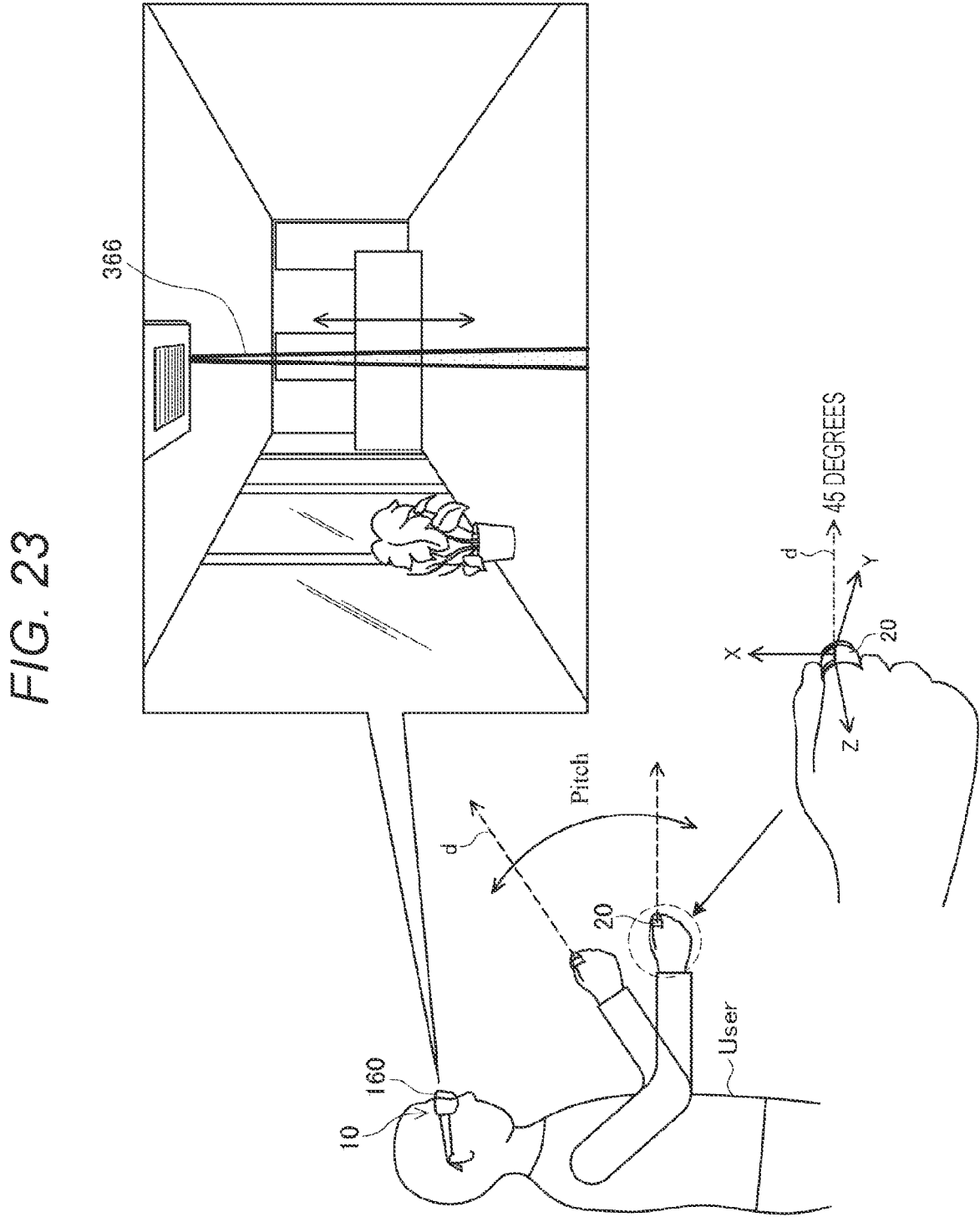
FIG. 23 is a view for describing movement of the pointer UI according to movement of the input device in a Pitch direction according to the present embodiment.

Note that, in a case where the geomagnetic sensor capable of detecting an absolute posture angle in the Yaw direction is not included and only the acceleration sensor and the gyro sensor are used as the motion sensor 240, a relative change in a Yaw posture angle by the gyro sensor is detected in posture detection in the Yaw direction relative to the ground. Therefore, in a case where control is intended such that a direction of the pointer UI 366 and a direction of an arm substantially match, there may be a case where the direction of the arm and the direction of the pointer UI 366 in the Yaw direction do not match. On the other hand, for example, in a case where a user raises an arm to a predetermined height in front of a body (for example, an angle in the Pitch direction at which a forearm is substantially horizontal as illustrated in FIG. 23), the control unit 120 may turn on display of the pointer UI 366 and set initial Yaw posture of the pointer UI 366 at that time to 0 degrees (front direction as illustrated in FIG. 21). With this arrangement, it is possible to start the control from a state where the direction of the pointer UI 366 and a direction of a hand are directed approximately toward the front and match. Since the subsequent change in the posture in the Yaw direction is detected by the gyro sensor, the matching between the directions of the pointer UI 366 and the hand can be continued. On the other hand, in posture detection in the Pitch direction relative to the ground, the absolute posture angle is obtained by a gravity direction (as illustrated in FIG. 23, 0 degrees in the Pitch direction is a horizontal direction).
Regarding Display Direction of Pointer UI 366

As illustrated in FIG. 21, a direction (left or right inclination) of the pointer UI 366 displayed on the display unit 160 may be rotationally offset relative to the Y axis of the input device 20 (direction intersecting a finger passing through the input device 20 at a right angle). In the example illustrated in FIG. 21, a direction d shifted by about 45 degrees from the Y axis of the input device 20 is set as the direction of the pointer UI 366 (left or right inclination with the center of the lower side of the display unit 160 as the base point). With this arrangement, as illustrated in FIG. 21, a direction of a forearm of a user and the direction (left or right inclination) of the pointer UI 366 can be substantially matched, and a more intuitive operation can be performed. Furthermore, also from a viewpoint of a joint motion range of a wrist, by performing the rotation offset as described above, as illustrated in FIG. 22, from a state in the center in FIG. 22 where a wrist angle is approximately 0 degrees, the direction of the pointer UI 366 can be moved with a low body load from a front direction to the horizontal direction by bending or extending movement of the wrist.

Figure 24:
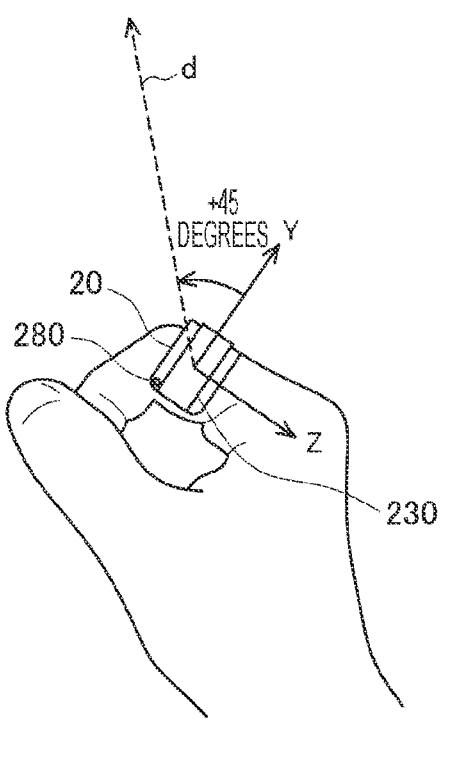
FIG. 24 is a view for describing a case where the input device according to the present embodiment is mounted on each of left and right index fingers.
Figure 24:
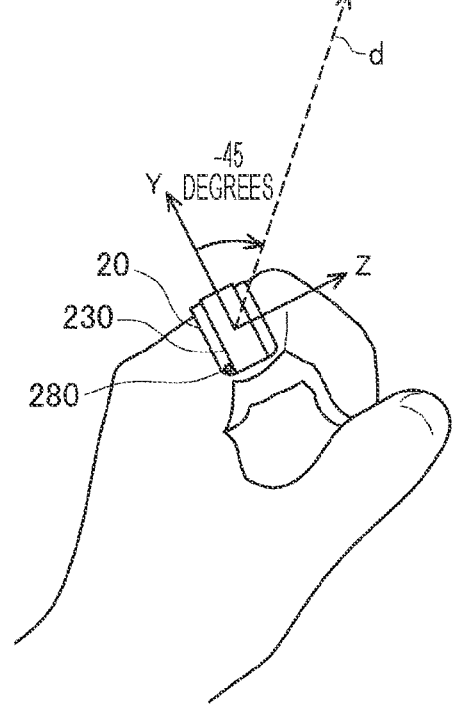

Furthermore, movement of the pointer UI 366 displayed on the display unit 160 in the vertical direction is controlled according to movement of the input device 20 in the Pitch direction as illustrated in FIG. 23. FIG. 23 is a view for describing movement of the pointer UI according to movement of the input device in the Pitch direction according to the present embodiment. As described above, in the present embodiment, movement of the pointer UI 366 in two directions (left and right and front and back) is implemented in the display unit 160 relative to inputs of two axes (Yaw, Pitch) using the input device 20. As illustrated in FIG. 23, for example, in a case where an arm of a user is directed upward by about 45 degrees relative to the horizontal direction, the pointer UI 366 is also in a state of extending obliquely 45 degrees in the upward direction relative to the real space from the horizontal direction and pointing toward a ceiling.
Regarding Direction of Rotation Offset The control unit 120 switches a direction of the pointer UI 366 (direction in which rotation offset is performed) depending on which of left and right fingers the input device 20 is mounted on. FIG. 24 is a view for describing a case where the input device 20 according to the present embodiment is mounted on each of left and right index fingers. In the input device 20 according to the present embodiment, for example, as illustrated in FIG. 3, the touch sensor 230 is provided on one side of the main body portion of the input device 20. Correct posture in which such an input device 20 is mounted on an index finger is posture in which the touch sensor 230 faces a thumb. Therefore, as illustrated in FIG. 24, when the input device 20 is mounted on the index finger in the correct posture, the left and right fingers are inserted in opposite directions (specifically, positive/negative direction of the Z axis).

Then, as illustrated on the left in FIG. 24, in a case where a user mounts the input device 20 on a right hand, the control unit 120 sets the direction (direction d) of the pointer UI 366 to a direction in which the Y axis of the input device 20 is rotationally offset around the X axis by, for example, about +45 degrees. Furthermore, as illustrated on the right in FIG. 24, in a case where the user mounts the input device 20 on a left hand, the control unit 120 sets the direction (direction d) of the pointer UI 366 to a direction in which the Y axis of the input device 20 is rotationally offset around the X axis by, for example, about −45 degrees. As described above, the direction of the pointer UI 366 can be changed according to the information indicating on which of the left and right hands the user mounts the input device 20.

As means for acquiring the information indicating on which of the left and right hands the user mounts the input device 20, for example, there is a method in which the user manually inputs the information using a screen UI or the like displayed on the display unit 160 of the display device 10. Alternatively, by recognizing the hand of the user and the input device 20 with the outward camera 140 of the display device 10, it is possible to determine on which hand the input device 20 is mounted. For example, as an initial operation at the time of mounting the input device 20, the user performs initial setting by holding the hand on which the input device 20 is mounted over an imaging area of the outward camera 140. Furthermore, mounting/demounting of the input device 20 is determined by, for example, a proximity sensor installed inside the input device 20.

Alternatively, by accumulating posture information at the time of mounting the input device 20, the control unit 120 can also determine whether the input device 20 is mounted on the right hand or the left hand. This is a method of performing estimation by statistically processing the posture information from the fact that a direction of an index finger is mainly directed to the ground during walking, and the like. Such estimation is performed every time the input device 20 is mounted or demounted.

Furthermore, in the example illustrated in FIG. 24, the input device 20 is mounted on a base joint portion of the finger (a joint of a root of the finger). However, as another example of the mounting position, a case is also assumed where the input device 20 is mounted on a middle joint portion (a joint at a center of the finger). In a case where the input device 20 is mounted on the middle joint portion in a state of the hand illustrated in FIG. 24 (the state where the index finger is bent), the control unit 120 reverses the direction of the rotation offset described above (for example, −45 degrees in the case of the right hand and +45 degrees in the case of the left hand) or sets the direction to 0 degrees. With this arrangement, also in a case where the input device 20 is mounted on the middle joint portion, the pointer UI 366 can be easily operated also from the viewpoint of the joint motion range of the wrist. Whether the input device 20 is mounted on the base joint portion or the middle joint portion can be determined by, for example, capturing the hand and the input device 20 with the outward camera 140 as in the determination of the left and right hands described above.

Operation of Real Object Using Pointer UI 366

Figure 25:
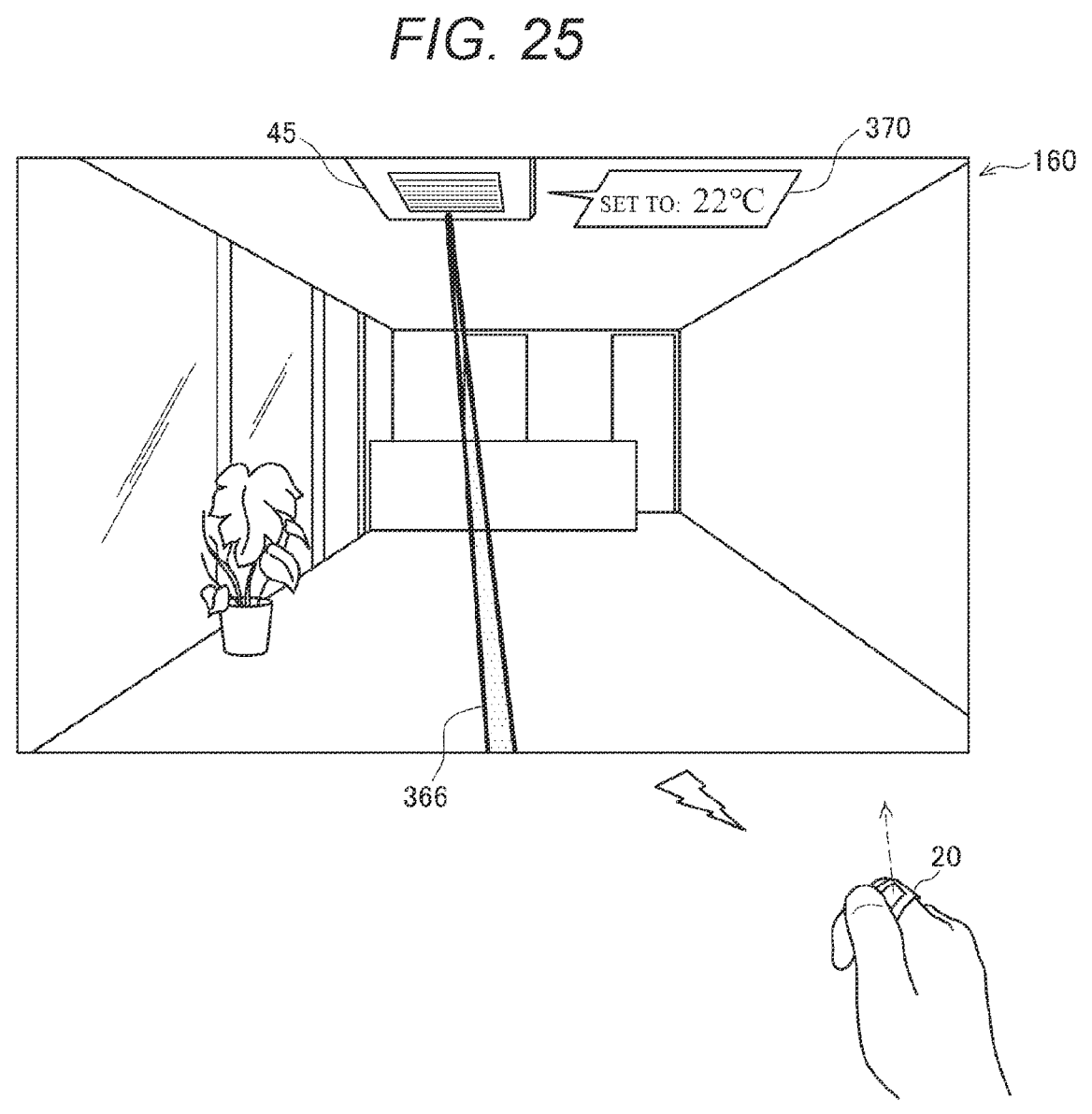

FIG. 25 is a view for describing an operation for a real object using the pointer UI according to the present embodiment. In the present embodiment, an operation is not limited to an operation of a virtual object that is a two-dimensional or three-dimensional image, and an operation of a real object is also possible. For example, as illustrated in FIG. 25, when the pointer UI 366 is placed on an air conditioner 45 that is a real object provided on a ceiling, a temperature operation panel 370 is displayed. The display device 10 can recognize the air conditioner 45 by the outward camera 140. A user can perform operations such as temperature adjustment and operation mode switching in a state where the temperature operation panel 370 is displayed. For example, an instruction to raise or lower temperature may be given by performing a swipe operation in the vertical direction in the touch sensor 230. The display device 10 and the air conditioner 45 are paired in advance and can transmit and receive data. Alternatively, the display device 10 can be connected by wireless communication to a home network to control the air conditioner 45 via the home network.

Regarding Display ON/OFF of Display Unit 160

The control unit 120 can also control ON/OFF of display itself of the display unit 160 according to an operation of the input device 20. By turning off the display of the display unit 160, power saving of battery capacity of the display device 10 can be implemented.

Examples of the display ON/OFF operation of the display unit 160 include a touch operation (a tap, a double tap, a triple tap, or a long touch), a push operation (a click operation, a double click operation, a triple click operation, or a long click operation using the push switch unit 290), or the like on the touch sensor 230 of the input device 20. Since the tap operation, the click operation, or the like may also conflict with an operation used in a remote operation using the pointer UI 366, the control unit 120 may turn off the display of the display unit 160 when, for example, a predetermined tap operation or click operation is performed when the pointer UI 366 is not displayed.

Figure 26:
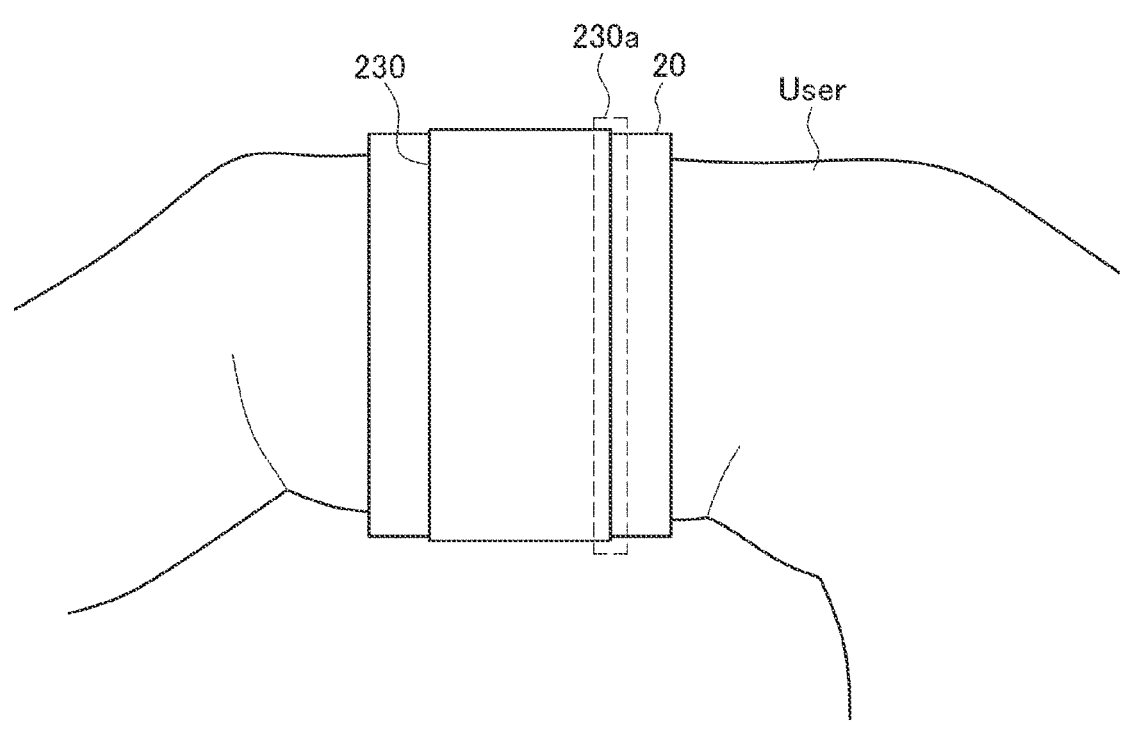
FIG. 26 is a view illustrating a one-side edge portion of a touch sensor provided in the input device according to the present embodiment.

Furthermore, examples of the display ON/OFF operation of the display unit 160 include a swipe operation on the touch sensor 230 of the input device 20 (display ON by a swipe operation in the upward direction, display OFF by a swipe operation in the downward direction, and the like). Also in this case, in order to separate from an operation on a two-dimensional image, a direct operation on a three-dimensional image, a remote operation, and the like, for example, only a swipe operation in the vertical direction in a one-side edge portion 230a of the touch sensor 230 as illustrated in FIG. 26 may be assigned to the display ON/OFF operation of the display unit 160. Note that which one of left and right edges is assigned to the display ON/OFF operation of the display unit 160 by an operation using an edge may be determined on the basis of the information regarding on which of the left and right fingers of the hand the input device 20 is mounted described above. Alternatively, an operation of an entire surface of the touch sensor 230 instead of the edge may be used for the display ON/OFF operation of the display unit 160. In this case, in order to avoid a conflict between a display OFF operation and screen scroll control, a swipe operation (for example, a swipe operation in the downward direction) may be assigned to display OFF control only in a case where there is no scrollable virtual object around a line-of-sight direction of a user.

Furthermore, by turning off line-of-sight detection and communication connection to a network in conjunction with the display OFF of the display unit 160, power consumption of the display device 10 can be further suppressed. Furthermore, in a case where the display of the display unit 160 is turned off, or in a case where the input device 20 is not operated for a certain period of time, the control unit 120 can suppress power consumption of the input device 20 by lowering a sampling rate of the touch sensor 230 of the input device 20, turning off sensing of the motion sensor 240, or the like.

The various operation methods according to the present embodiment has been specifically described above. According to the present embodiment, an operation of a desired two-dimensional or three-dimensional object (virtual object) can be implemented by a low-load operation with one hand.

5. Mounting Position and Structure of Input Device 20

<5-1. Mounting Position of Input Device 20>

The input device 20 according to the present embodiment may be mounted on a base joint portion of a finger (a joint of a root of the finger) as illustrated in FIG. 24 and the like, or may be mounted on a middle joint portion (a joint at a center of the finger) as another example of a mounting position. Furthermore, a user may appropriately change the mounting position according to a use scene.

<5-2. Structure of Input Device 20>

For the structure of the input device 20, as described above with reference to FIG. 3, a part of the C-shaped ring forming the main body portion of the input device 20 can be plastically deformed, which enables the input device 20 to be mounted on fingers having different thicknesses. Note that the structure of the input device 20 according to the present embodiment is not limited to the example illustrated in FIG. 3. Hereinafter, another structure example of the input device 20 according to the present embodiment will be specifically described with reference to FIGS. 27 to 29.

Figure 27:
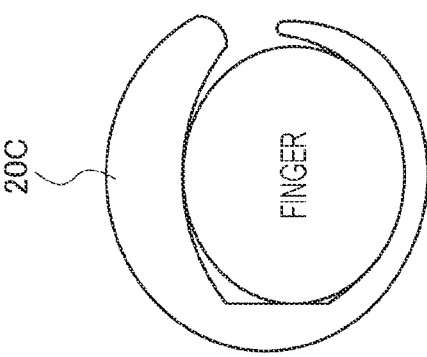
FIG. 27 is a view for describing an example of a structure of the input device according to the present embodiment.
Figure 27:
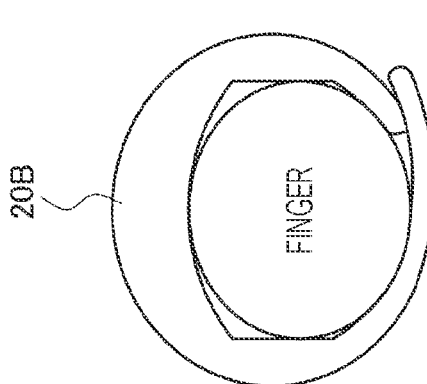
Figure 27:
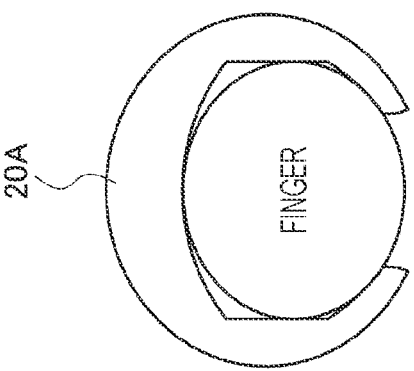

As described above, the input device 20 according to the present embodiment may have shape that closes in a ring shape or a shape that does not close in a ring shape. A specific example of the shape that does not close in a ring shape is illustrated in FIG. 27. FIG. 27 is a view for describing an example of the structure of the input device 20 according to the present embodiment. The cross-sectional view illustrated in FIG. 27 is a view of the input device 20 as viewed from a direction in which a finger is passed. An input device 20A illustrated on the left in FIG. 27 has a C-shaped ring shape also illustrated in FIG. 3. An input device 20B illustrated in the center in FIG. 27 is an example of a notched ring shape. An input device 20C illustrated on the right in FIG. 27 is an example of another C-shaped ring shape. As described above, the input device 20 according to the present embodiment can cope with fingers having different thicknesses by the ring shape having a portion that does not close. Furthermore, by providing a plastically deformable portion in a part of the ring, adjustment in a wider range is possible.

Figure 28:
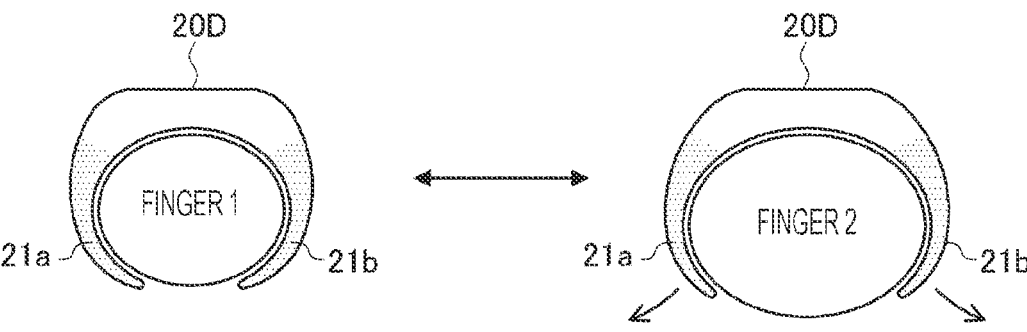
FIG. 28 is a view for describing a structure in which a part of a ring-shaped main body portion forming the input device according to the present embodiment includes a deformable portion.
Figure 28:
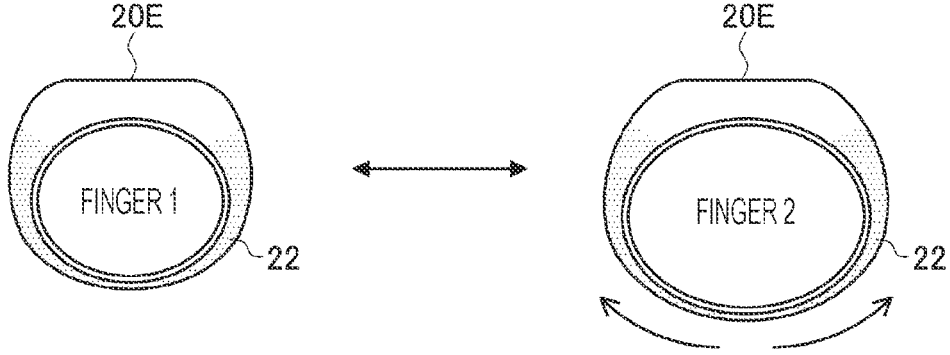
Figure 28:
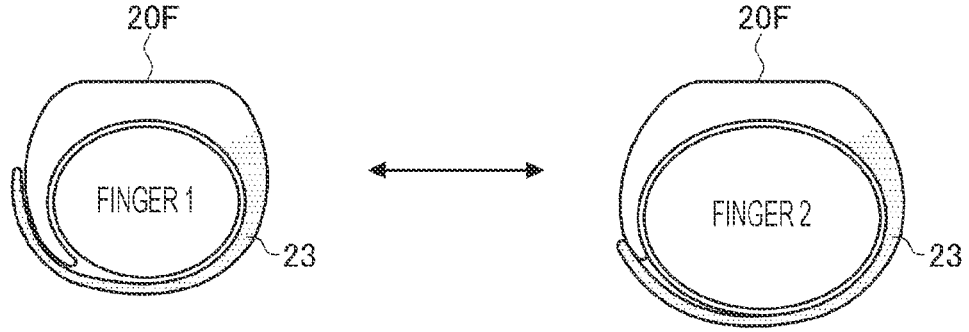
Figure 29:
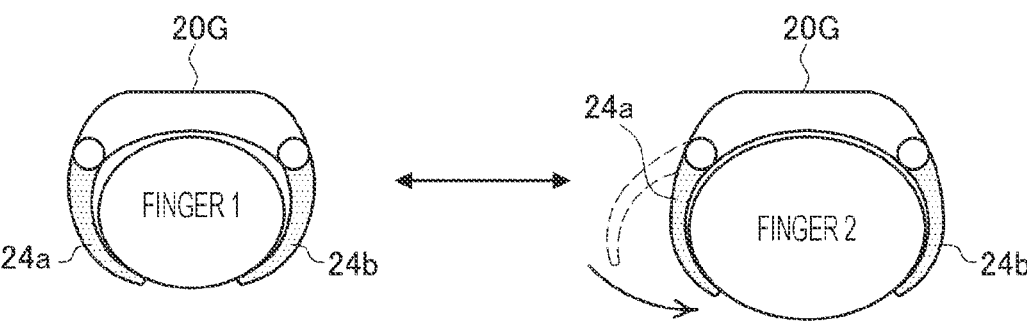
FIG. 29 is a view for describing the structure in which a part of the ring-shaped main body portion forming the input device according to the present embodiment includes the deformable portion.
Figure 29:
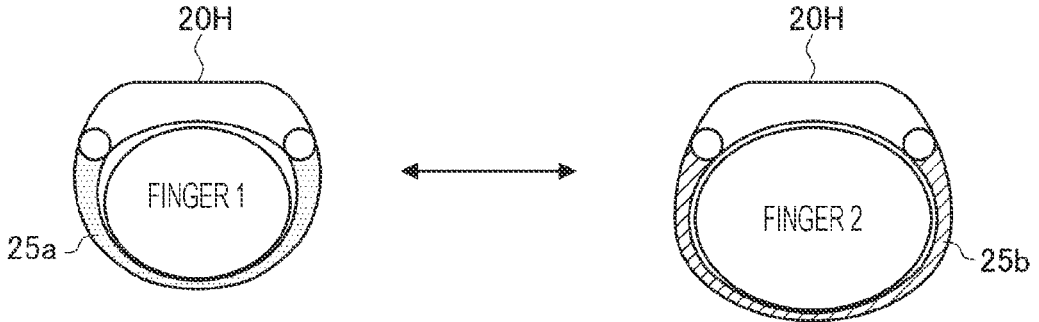

FIGS. 28 and 29 are views for describing a structure in which a part of the ring-shaped main body portion forming the input device 20 according to the present embodiment includes a deformable portion. First, in an input device 20D illustrated in an upper part of FIG. 28, a part of the C-shaped ring includes deformation portions 21a and 21b including a flexible material by integral formation or the like. Since the input device 20D is mounted on a finger by a method in which the finger is inserted through a notched gap formed between the deformation portions 21a and 21b, convenience of removal is high. Furthermore, even a finger 2 is thicker than a finger 1, the mounting can be performed by bending of the deformation portions 21a and 21b.

In an input device 20E illustrated in a middle part of FIG. 28, a deformation portion 22 that includes a stretchable material that expands and contracts according to a thickness of a finger is configured by integral formation or the like in a part of the O-shaped ring-shaped main body portion that has a shape that closes in a ring shape. Since the input device 20E is mounted on a finger by a method of passing the finger through a hole, the input device 20E is less likely to fall off.

In an input device 20F illustrated in a lower part of FIG. 28, a deformation portion 23 that is reversibly deformable according to a thickness of a finger is configured by integral formation or the like in a part of the ring-shaped main body portion. The input device 20F is a belt-type ring having a shape that is mounted on a finger by turning up the deformation portion 23 and inserting the finger, and wrapping the deformation portion 23 around the finger. The input device 20F as the belt-type ring is easy to remove and is less likely to fall off. A method of locking the deformation portion 23 may be, for example, half force of deformation, attraction of a magnet or the like, and the like.

Furthermore, in an input device 20G illustrated in an upper part of FIG. 29, deformation portions 24a and 24b movable according to a thickness of a finger are provided in a part of the C-shaped ring-shaped main body portion. The input device 20G is mounted on a finger by a method in which the finger is inserted through a notched gap formed between the deformation portions 24a and 24b. The deformation portions 24a and 24b are configured in, for example, a holding spring type in which a spring pressure is applied in a direction of pressing the finger and strength is adjusted so as not to return by a latch mechanism in an opening direction.

An input device 20H illustrated in a lower part of FIG. 29 is formed by a structure in which an attachment 25 (25a, 25b) replaceable according to a thickness of a finger is mounted in a part of the main body portion. For example, in the case of a finger 1, the attachment 25a is mounted, and in the case of a finger 2 thicker than the finger 1, the attachment 25b is mounted. Each attachment 25 is formed in a shape along a pad of a finger. When the input device 20 is mounted on a finger, one of connection portions provided at both ends of the attachment 25 may be removed and opened, and the finger may be inserted from the opened portion. By forming the attachment 25 by using a material that is soft and slightly stretchable, it is possible to cope with more finger sizes.

The deformation portion that deforms according to a thickness of a finger described above is provided at a portion mainly positioned on a pad side of the finger when the input device 20 is mounted. At this time, each configuration (unit) such as the communication unit 210, the control unit 220, the motion sensor 240, the vibration unit 250, and the storage unit 260 of the input device 20 can be provided on an upper portion (portion mainly positioned on a back side of the finger when mounted on the finger) of the input device 20. Furthermore, since the touch sensor 230 is provided on a side facing a thumb so that an operation can be performed with the thumb when the input device 20 is mounted, the touch sensor 230 may also be provided at the deformation portion of the input device 20.

6. Modification

Subsequently, a modification of the present embodiment will be described.

<6-1. Audio Input From Input Device 20>

It is also possible to provide an audio input unit in the input device 20 to cope with audio input. Furthermore, in consideration of a situation where it is difficult to speak, such as in a train, the input device 20 may be provided with silent audio input means. In the present specification, a case of whispering with a very small volume or a case of performing an uttering operation without uttering at all is referred to as silent. The silent audio input means analyzes, for example, vibration of a throat when a whisper that cannot be heard by another person is uttered, vibration of a throat in a case where uttering is performed in a state where a mouth is closed, and information (for example, an ultrasonic echo video) in a throat and an oral cavity in a case where an uttering operation without uttering at all (so-called lip-syncing) is performed, and implements an audio text input and audio command recognition. The information regarding vibration of the throat and in the oral cavity can be acquired by various sensors (a vibration sensor and an ultrasonic sensor) provided in the input device 20 in a state where the input device 20 is in contact with a submandibular region. These pieces of information may be analyzed by the control unit 120 of the display device 10.

<6-2. Another Use Method of Input Device 20>

The input device 20 according to the present embodiment may be used not only for an operation input to the display device 10 as described above, but also for an operation input to, for example, an audio output device. The audio output device may be various speakers (a neck hanging speaker, an earphone-type speaker, and a headphone-type speaker) mounted on a user, or may be an audio device installed in a room or a car.

Furthermore, the input device 20 according to the present embodiment may be used alone. For example, it may be used as a device for communicating with others. Furthermore, the input device 20 may be used as a remote controller (remote controller) of a TV or the like.

7. Supplement

As described above, in the information processing device according to the embodiment of the present disclosure, it is possible to perform an operation input that is more natural, less burdensome, and less bothersome in operations in daily life.

The preferred embodiment of the present disclosure has been described above in detail with reference to the accompanying drawings, but the present technology is not limited to such examples. It is apparent that those with ordinary skill in the technical field of the present disclosure can conceive various modifications or corrections within the scope of the technical idea recited in claims, and it is naturally understood that they also fall within the technical scope of the present disclosure.

For example, the operation input means in the input device 20 is not limited to a touch operation using the touch sensor 230, and may be a click operation using the push switch, a motion input using the motion sensor 240, a pressing operation using the pressure sensor, or the like. Furthermore, these may be appropriately used in combination.

Furthermore, a glasses-type device mounted on a head of a user has been exemplified as the display device that displays a virtual object, but the display device according to the present embodiment is not limited thereto. The display device may be, for example, a smartphone or a tablet terminal, or may be a display device (which can be mounted on one ear) that presents a video to one eye of a user. Furthermore, an operation object by the input device 20 is not limited to a virtual object superimposed and displayed on the real space. For example, it may be a virtual object in a virtual space displayed on the display device. Furthermore, when the display device is implemented by a projector, a virtual object included in an image projected by the projector may be the operation object.

For example, one or more computer programs for causing hardware such as a CPU, a ROM, and a RAM incorporated in the display device 10 or the input device 20 described above to exert functions of the display device 10 or the input device 20 can also be created. Furthermore, a computer-readable storage medium that stores the one or more computer programs is also provided.

Furthermore, the effects described in the present specification are merely illustrative or exemplary, and not restrictive. That is, the technology according to the present disclosure can exhibit other effects apparent to those skilled in the art from the description of the present specification, in addition to the effects described above or instead of the effects described above.

Note that the present technology can also have the following configuration.

(1)

An input device including:

a ring-shaped main body portion to be mounted on a finger of a user;

one or more sensors that are provided in the main body portion and that detect information regarding an operation input by another finger;

a communication unit that performs wireless communication with an external device; and a control unit that performs control to transmit the information regarding the operation input detected by the one or more sensors to the external device by the communication unit.

(2)

The input device according to (1), in which the one or more sensors are provided at positions facing a thumb at a time of mounting in the main body portion.

(3)

The input device according to (2), in which the one or more sensors include at least one of a touch sensor that detects a touch operation or a switch sensor that detects a switch operation.

(4)

The input device according to any one of (1) to (3), in which at least the communication unit and the control unit are provided on an upper portion of the main body portion positioned on a back side of the finger at the time of mounting.

(5)

The input device according to any one of (1) to (4), in which the ring shape is either a shape that closes in a ring shape or a shape that does not close in a ring shape.

(6)

The input device according to any one of (1) to (5), in which a part of the main body portion includes a deformable portion.

(7)

The input device according to any one of (1) to (5), in which the main body portion includes a replaceable attachment corresponding to a thickness of a finger.

(8)

The input device according to any one of (1) to (7), further including a motion sensor that is provided in the main body portion and that detects movement, in which the control unit performs control to transmit a detection result by the motion sensor to the external device by the communication unit.

(9)

The input device according to any one of (1) to (8), further including a vibration unit provided in the main body portion, in which the control unit controls the vibration unit according to information received from the external device by the communication unit.

(10)

The input device according to any one of (1) to (9), in which the external device is a display device or an audio output device used by the user.

(11)

The input device according to any one of (1) to (10), further including a distance sensor that is provided in the main body portion and that detects a distance to the another finger or a distance to a predetermined joint of the finger on which the input device is mounted, in which the control unit performs control to transmit a detection result by the distance sensor to the external device by the communication unit.

(12)

A system including:

an operation input information acquisition unit that acquires, from one or more sensors that are provided in a ring-shaped main body portion to be mounted on a finger of a user and that detect information regarding an operation input by another finger, the information regarding the operation input;

a line-of-sight information acquisition unit that acquires line-of-sight information regarding the user; and a presentation control unit that controls information to be presented to the user on the basis of the information regarding the operation input and the line-of-sight information.

(13)

The system according to (12), in which the information to be presented to the user includes at least one of tactile information given by a vibration unit, visual information given by a display unit, or auditory information given by an audio output unit.

(14)

The system according to (12) or (13), including:

an input device including:

the main body portion;

the one or more sensors provided in the main body portion;

a communication unit that performs wireless communication with an information processing device used by the user; and a control unit that performs control to transmit the information regarding the operation input detected by the one or more sensors to the information processing device by the communication unit, and the information processing device including:

the operation input information acquisition unit that acquires the information regarding the operation input transmitted from the input device;

the line-of-sight information acquisition unit; and the presentation control unit.

(15)

The system according to (14), in which the information processing device is a display device mounted on a head of the user, and the presentation control unit performs display control of a two-dimensional or three-dimensional image superimposed and displayed on a real space in the display device, recognizes an image as an operation object according to the line-of-sight information, and performs control based on the information regarding the operation input on the recognized image as the operation object.

(16)

The system according to (15), in which the presentation control unit recognizes an operation position on a display screen of the display device on the basis of the line-of-sight information, and further adjusts the operation position according to information regarding a predetermined operation input.

(17)

The system according to (15) or (16), in which the presentation control unit performs control on the image as the operation object on the basis of the information regarding the operation input, and performs presentation control of tactile information by a vibration unit provided in the input device.

(18)

A control method by a processor, the control method including:

detecting, by one or more sensors provided in a ring-shaped main body portion to be mounted on a finger of a user, information regarding an operation input by another finger; and performing control to transmit the detected information regarding the operation input to an external device by a communication unit that performs wireless communication.

(19)

A control method by a processor, the control method including:

acquiring, from one or more sensors that are provided in a ring-shaped main body portion to be mounted on a finger of a user and that detect information regarding an operation input by another finger, the information regarding the operation input;

acquiring line-of-sight information regarding the user; and controlling information to be presented to the user on the basis of the information regarding the operation input and the line-of-sight information.

REFERENCE SIGNS LIST

10 Display device
110 Communication unit
120 Control unit
121 Display control unit
130 Line-of-sight detection unit
140 Outward camera
150 Operation input unit
160 Display unit
170 Audio output unit
180 Storage unit
20 Input device
210 Communication unit
220 Control unit
221 Vibration control unit
230 Touch sensor
240 Motion sensor
250 Vibration unit
260 Storage unit

The invention claimed is:

1. A system comprising:

an input device including:

a ring-shaped main body portion to be mounted on a finger of a user's hand;

a touch sensor provided in the main body portion and configured to detect a tap operation;

a push sensor that is arranged on a back side of the touch sensor and configured to detect a push operation by another finger of the user's hand; and first circuitry configured to:

control to transmit first information according to the push operation and second information according to the tap operation to an information processing apparatus; and the information processing apparatus including:

second circuitry configured to:

perform a first control of the information processing apparatus based on the first information;

perform a second control of the information processing apparatus different than the first control based on the second information; and control a display to display at least one of a first virtual object or a second virtual object based on information indicating which of left fingers of the user's left hand and right fingers of the user's right hand the input device is mounted on.

2. The system according to claim 1, wherein the touch sensor is provided at a position facing a thumb at a time of mounting in the main body portion.

3. The system according to claim 2, wherein the main body portion is C-shaped.

4. The system according to claim 1, wherein at least the first circuitry is provided on an upper portion of the main body portion positioned on a back side of the finger at a time of mounting.

5. The system according to claim 1, wherein a part of the main body portion includes a deformable portion.

6. The system according to claim 1, wherein the main body portion includes a replaceable attachment corresponding to a thickness of a finger.

7. The system according to claim 1, wherein the information processing apparatus comprises:
a camera configured to capture an image,
wherein the second circuitry is further configured to determine a display position and a display posture of the first virtual object based on the image during the first virtual object following the user's hand.

8. The system according to claim 1, wherein the input device further comprises:
a vibration unit provided in the main body portion,
wherein the first circuitry is further configured to control the vibration unit according to information received from the information processing apparatus.

9. The system according to claim 1, wherein the information processing apparatus is a display device or an audio output device used by the user.

10. The system according to claim 1, wherein the input device further comprises
a distance sensor that is provided in the main body portion and that detects a distance to the another finger or a distance to a predetermined joint of the finger on which the input device is mounted,
wherein the first circuitry is further configured to perform control to transmit a detection result by the distance sensor to the information processing apparatus.

11. The system according to claim 1, wherein the second circuitry is further configured to:
control the display to display a third virtual object to manually input the information indicating which of the left fingers and the right fingers the input device is mounted on.

12. The system according to claim 1, wherein the push sensor is a push switch or a pressure sensor.

13. The system according to claim 1, wherein
the first control includes to control the display included in the information processing apparatus to display a first virtual object following the user's hand based on the first information, and
the second control includes to control the display to display a second virtual object that is different from the first virtual object based on the second information.

14. A system comprising:
an information processing device including:
first circuitry configured to:
acquire, from a push sensor that is arranged on a back side of a touch sensor provided in a ring-shaped main body portion to be mounted on a finger of a user's hand and that is configured to detect a push operation by another finger of the user's hand, first information according to the push operation;

acquire, from the touch sensor that is configured to detect a tap operation, second information according to the tap operation;
perform a first control of the information processing device based on the first information;
perform a second control of the information processing device different than the first control based on the second information; and
control a display to display at least one of a first object or a second virtual object based on information indicating which of left fingers of the user's left hand and right fingers of the user's right hand the ring-shaped main body portion is mounted on.

15. The system according to claim 14, wherein the first circuitry is further configured to control information to be presented to the user includes including at least one of tactile information given by a vibration unit, visual information given by the display, or auditory information given by an audio output unit.

16. A control method by a processor, the control method comprising:
detecting, by a push sensor that is arranged on a back side of a touch sensor provided in a ring-shaped main body portion of an input device to be mounted on a finger of a user's hand, a push operation by another finger of the user's hand;
detecting, by the touch sensor configured to detect a tap operation, a tap operation;
controlling, by the input device, to transmit first information according to the push operation and second information according to the tap operation to an information processing device;
performing, by the information processing device, a first control of the information processing device based on the first information;
performing, by the information processing device, a second control of the information processing device different than the first control based on the second information; and
controlling a display to display at least one of a first virtual object or a second virtual object based on information indicating which of left fingers of the user's left hand and right fingers of the user's right hand the input device is mounted on.

17. A control method by a processor, the control method comprising:
acquiring, from a push sensor that is arranged on a back side of a touch sensor provided in a ring-shaped main body portion to be mounted on a finger of a user's hand and that is configured to detect a push operation by another finger of the user's hand, first information according to the push operation;
acquiring, from the touch sensor that that is configured to detect a tap operation, second information according to the tap operation;
performing a first control of the processor based on the first information;
performing a second control of the processor different than the first control based on the second information; and
controlling a display to display of at least one of a first virtual object or a second virtual object based on information indicating which of left fingers of the user's left hand and right fingers of the user's right hand the ring-shaped main body portion is mounted on.

18. A system comprising:

an input device including:

a ring-shaped main body portion to be mounted on a finger of a user's hand;

one or more sensors configured to detect an operation input by the user; and first circuitry configured to:

control to transmit information according to the operation to an information processing apparatus; and the information processing apparatus including:

a display; and second circuitry configured to:

obtain hand information indicating which of left fingers of the user's left hand and right fingers of the user's right hand the input device is mounted on; and control the display to display at least one of a first virtual object or a second virtual object based on the hand information.

19. The system according to claim 18, wherein the one or more sensors include:

a touch sensor provided in the main body portion and configured to detect a tap operation; and a push sensor that is arranged on a back side of the touch sensor and configured to detect a push operation by another finger of the user's hand, and wherein the first circuitry is further configured to control to transmit first information according to the push operation and second information according to the tap operation to the information processing apparatus.

20. The system according to claim 19, wherein second circuitry is further configured to:

perform a first control of the information processing apparatus based on the first information; and perform a second control of the information processing apparatus different than the first control based on the second information.

\* \* \* \* \*